United States Patent
Kobayashi

(10) Patent No.: US 8,468,285 B2
(45) Date of Patent: Jun. 18, 2013

(54) OPERATION OF VIDEO SOURCE AND SINK WITH TOGGLED HOT PLUG DETECTION

(75) Inventor: Osamu Kobayashi, Los Altos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 455 days.

(21) Appl. No.: 12/760,511

(22) Filed: Apr. 14, 2010

(65) Prior Publication Data

US 2010/0289949 A1 Nov. 18, 2010

Related U.S. Application Data

(60) Provisional application No. 61/179,295, filed on May 18, 2009.

(51) Int. Cl.
 *G06F 13/00* (2006.01)
(52) U.S. Cl.
 USPC ............... 710/302; 710/17; 710/18; 710/300; 710/301; 710/303; 710/304
(58) Field of Classification Search
 USPC .................................................. 710/300–304
 See application file for complete search history.

(56) References Cited

U.S. PATENT DOCUMENTS

| | | | |
|---|---|---|---|
| 4,479,142 A | 10/1984 | Buschman et al. | |
| 4,796,203 A | 1/1989 | Roberts | |
| 5,245,612 A | 9/1993 | Kachi et al. | |
| 5,258,983 A | 11/1993 | Lane et al. | |
| 5,369,775 A | 11/1994 | Yamasaki et al. | |
| 5,425,101 A | 6/1995 | Woo et al. | |
| 5,515,296 A | 5/1996 | Agarwal | |
| 5,541,919 A | 7/1996 | Yong et al. | |
| 5,608,418 A | 3/1997 | McNally | |
| 5,615,376 A | 3/1997 | Ranganathan | |
| 5,625,379 A | 4/1997 | Reinert et al. | |
| 5,629,715 A | 5/1997 | Zenda | |
| 5,670,973 A | 9/1997 | Bassetti, Jr. et al. | |
| 5,739,803 A | 4/1998 | Neugebauer | |
| 5,745,837 A | 4/1998 | Fuhrmann | |
| 5,790,083 A | 8/1998 | Bassetti | |
| 5,805,173 A | 9/1998 | Glennon et al. | |
| 5,838,875 A | 11/1998 | Cho et al. | |
| 5,852,630 A | 12/1998 | Langberg et al. | |
| 5,909,465 A | 6/1999 | Bottomley et al. | |
| 5,918,002 A | 6/1999 | Klemets et al. | |
| 5,926,155 A | 7/1999 | Arai et al. | |

(Continued)

FOREIGN PATENT DOCUMENTS

| | | |
|---|---|---|
| CN | 1353513 | 6/2002 |
| EP | 0 354 480 A | 2/1990 |

(Continued)

OTHER PUBLICATIONS

Genesis—"DisplayPort Update and Overview"—31 Pages; Dated Oct. 5, 2007.*

(Continued)

*Primary Examiner* — Brian Misiura
(74) *Attorney, Agent, or Firm* — Beyer Law Group, LLP

(57) ABSTRACT

Methods and systems are described for transmitting and displaying video data after a hot plug event during a start-up dead period. In particular, hot plug events occurring when a toggleable hot plug detection mechanism is use.

18 Claims, 16 Drawing Sheets

U.S. PATENT DOCUMENTS

| | | | |
|---|---|---|---|
| 5,940,137 A | 8/1999 | Hulvey |
| 5,949,437 A | 9/1999 | Clark |
| 6,005,861 A | 12/1999 | Humpleman |
| 6,020,901 A | 2/2000 | Lavelle et al. |
| 6,038,000 A | 3/2000 | Hurst, Jr. |
| 6,049,316 A | 4/2000 | Nolan et al. |
| 6,049,769 A | 4/2000 | Holmes et al. |
| 6,069,929 A | 5/2000 | Yabe et al. |
| 6,151,334 A | 11/2000 | Kim et al. |
| 6,151,632 A | 11/2000 | Chaddha et al. |
| 6,154,225 A | 11/2000 | Kou et al. |
| 6,175,573 B1 | 1/2001 | Togo et al. |
| 6,177,922 B1 | 1/2001 | Schiefer et al. |
| 6,219,736 B1 | 4/2001 | Klingman |
| 6,223,089 B1 | 4/2001 | Page |
| 6,249,319 B1 | 6/2001 | Post |
| 6,326,961 B1 | 12/2001 | Lin et al. |
| 6,330,605 B1 | 12/2001 | Christensen et al. |
| 6,337,964 B2 | 1/2002 | Inami et al. |
| 6,353,594 B1 | 3/2002 | Tooker et al. |
| 6,356,260 B1 | 3/2002 | Montalbo |
| 6,437,768 B1 | 8/2002 | Kubota et al. |
| 6,441,857 B1 | 8/2002 | Wicker et al. |
| 6,446,130 B1 | 9/2002 | Grapes |
| 6,477,252 B1 | 11/2002 | Faber et al. |
| 6,542,967 B1 | 4/2003 | Major |
| 6,543,053 B1 | 4/2003 | Li et al. |
| 6,545,688 B1 | 4/2003 | Loveridge et al. |
| 6,577,303 B2 | 6/2003 | Kim |
| 6,587,480 B1 | 7/2003 | Higgins et al. |
| 6,598,161 B1 | 7/2003 | Kluttz et al. |
| 6,600,469 B1 | 7/2003 | Nukiyama et al. |
| 6,608,828 B1 | 8/2003 | Balachandran |
| 6,614,800 B1 | 9/2003 | Genty et al. |
| 6,661,422 B1 | 12/2003 | Valmiki et al. |
| 6,697,376 B1 | 2/2004 | Son et al. |
| 6,704,310 B1 | 3/2004 | Zimmermann et al. |
| 6,765,931 B1 | 7/2004 | Rabenko et al. |
| 6,778,168 B2 | 8/2004 | Mamiya et al. |
| 6,862,606 B1 | 3/2005 | Major et al. |
| 6,865,188 B1 | 3/2005 | Stirling et al. |
| 6,873,625 B1 | 3/2005 | Yoo et al. |
| 6,903,716 B2 | 6/2005 | Kawabe et al. |
| 6,909,442 B2 | 6/2005 | Hiyama et al. |
| 6,914,637 B1 | 7/2005 | Wolf et al. |
| 6,963,968 B2 | 11/2005 | Kori |
| 6,973,069 B1 | 12/2005 | Spear et al. |
| 6,975,645 B1 | 12/2005 | Suzuki et al. |
| 7,046,631 B1 | 5/2006 | Giroux et al. |
| 7,075,987 B2 | 7/2006 | Kim et al. |
| 7,099,277 B2 | 8/2006 | Sahinoglu et al. |
| 7,136,415 B2 | 11/2006 | Yun et al. |
| 7,177,329 B2 | 2/2007 | Kobayashi et al. |
| 7,194,554 B1 | 3/2007 | Short et al. |
| 7,248,590 B1 | 7/2007 | Liu |
| 7,256,790 B2 | 8/2007 | Valmiki et al. |
| 7,295,578 B1 | 11/2007 | Lyle et al. |
| 7,525,975 B2 | 4/2009 | Caspi et al. |
| 7,620,062 B2 * | 11/2009 | Kobayashi ............ 370/433 |
| 7,853,731 B1 * | 12/2010 | Zeng ................ 710/18 |
| 7,937,501 B2 * | 5/2011 | Goodart et al. ........... 710/2 |
| 8,051,217 B2 * | 11/2011 | Goodart et al. ............. 710/17 |
| 2001/0030649 A1 | 10/2001 | Mamiya et al. |
| 2001/0036193 A1 | 11/2001 | Kori |
| 2001/0038387 A1 | 11/2001 | Tomooka et al. |
| 2001/0052011 A1 | 12/2001 | Nagao |
| 2002/0007452 A1 | 1/2002 | Traw et al. |
| 2002/0011996 A1 | 1/2002 | Inoue et al. |
| 2002/0060676 A1 | 5/2002 | Kim |
| 2002/0061024 A1 | 5/2002 | Malkemes et al. |
| 2002/0062394 A1 | 5/2002 | Bunn et al. |
| 2002/0071055 A1 | 6/2002 | Ooshima et al. |
| 2002/0071390 A1 | 6/2002 | Reeves et al. |
| 2002/0075902 A1 | 6/2002 | Abbas et al. |
| 2002/0080468 A1 | 6/2002 | Crummey et al. |
| 2002/0085582 A1 | 7/2002 | Kim |
| 2002/0089517 A1 | 7/2002 | Ludtke et al. |
| 2002/0122515 A1 | 9/2002 | Bodenschatz |
| 2002/0136219 A1 | 9/2002 | Ding et al. |
| 2002/0149617 A1 | 10/2002 | Becker |
| 2002/0163598 A1 | 11/2002 | Pasqualino |
| 2002/0164022 A1 | 11/2002 | Strasser et al. |
| 2002/0184327 A1 | 12/2002 | Major et al. |
| 2002/0190974 A1 | 12/2002 | Morita |
| 2002/0190978 A1 | 12/2002 | Agarwal et al. |
| 2003/0035442 A1 | 2/2003 | Eng |
| 2003/0048852 A1 | 3/2003 | Hwang et al. |
| 2003/0063077 A1 | 4/2003 | Koyama |
| 2003/0076282 A1 | 4/2003 | Ikeda et al. |
| 2003/0080971 A1 | 5/2003 | Hochmuth et al. |
| 2003/0112822 A1 | 6/2003 | Hong et al. |
| 2003/0145258 A1 | 7/2003 | Warner et al. |
| 2003/0149987 A1 | 8/2003 | Pasqualino et al. |
| 2003/0152160 A1 | 8/2003 | Bauch et al. |
| 2003/0174156 A1 | 9/2003 | Katsuhara et al. |
| 2003/0174795 A1 | 9/2003 | Bruhnke et al. |
| 2003/0177423 A1 | 9/2003 | Komatsu et al. |
| 2003/0212811 A1 | 11/2003 | Thornton |
| 2004/0049705 A1 | 3/2004 | Liebenow |
| 2004/0080671 A1 | 4/2004 | Siemens et al. |
| 2004/0081151 A1 | 4/2004 | Greis et al. |
| 2004/0088469 A1 | 5/2004 | Levy |
| 2004/0103333 A1 | 5/2004 | Martwick et al. |
| 2004/0114607 A1 | 6/2004 | Shay et al. |
| 2004/0198386 A1 | 10/2004 | Dupray |
| 2004/0203383 A1 | 10/2004 | Kelton et al. |
| 2004/0210805 A1 | 10/2004 | Kimelman et al. |
| 2004/0218598 A1 | 11/2004 | Kobayashi |
| 2004/0218599 A1 | 11/2004 | Kobayashi |
| 2004/0218624 A1 | 11/2004 | Kobayashi |
| 2004/0218625 A1 | 11/2004 | Kobayashi |
| 2004/0218627 A1 | 11/2004 | Kobayashi |
| 2004/0221056 A1 | 11/2004 | Kobayashi |
| 2004/0221180 A1 | 11/2004 | Enami et al. |
| 2004/0221312 A1 | 11/2004 | Kobayashi |
| 2004/0221315 A1 | 11/2004 | Kobayashi |
| 2004/0228365 A1 | 11/2004 | Kobayashi |
| 2004/0233181 A1 | 11/2004 | Kobayashi |
| 2004/0240454 A1 | 12/2004 | Yamauchi et al. |
| 2004/0243905 A1 | 12/2004 | Merritt |
| 2005/0062699 A1 | 3/2005 | Kobayashi |
| 2005/0062711 A1 | 3/2005 | Kobayashi |
| 2005/0066085 A1 | 3/2005 | Kobayashi |
| 2005/0103333 A1 | 5/2005 | Bonutti |
| 2005/0225547 A1 | 10/2005 | Choi |
| 2006/0036788 A1 | 2/2006 | Galang et al. |
| 2006/0059092 A1 | 3/2006 | Burshan et al. |
| 2006/0117371 A1 | 6/2006 | Margulis |
| 2006/0209890 A1 | 9/2006 | MacMullan et al. |
| 2007/0049086 A1 | 3/2007 | Sakane |
| 2007/0097885 A1 | 5/2007 | Traversat et al. |
| 2007/0140298 A1 | 6/2007 | Eng |
| 2008/0175277 A1 | 7/2008 | Yin et al. |
| 2008/0284761 A1 | 11/2008 | Knee et al. |
| 2010/0289950 A1 * | 11/2010 | Kobayashi .................... 348/469 |
| 2010/0289955 A1 * | 11/2010 | Kobayashi .................... 348/537 |
| 2010/0293366 A1 * | 11/2010 | Kobayashi ........................ 713/2 |

FOREIGN PATENT DOCUMENTS

| | | |
|---|---|---|
| EP | 0 385 449 A1 | 9/1990 |
| EP | 0 674 440 A2 | 9/1995 |
| EP | 0 674 441 A1 | 9/1995 |
| EP | 078 8048 | 6/1997 |
| EP | 1 041 823 A2 | 10/2000 |
| EP | 1 069 721 A2 | 1/2001 |
| EP | 1 089 503 | 4/2001 |
| EP | 1 154 354 A | 11/2001 |
| EP | 1 229 690 A | 8/2002 |
| EP | 1 251 664 A2 | 10/2002 |
| EP | 1 432 203 | 6/2004 |
| EP | 1 473 700 | 11/2004 |
| EP | 1 517 292 A2 | 3/2005 |
| EP | 1 519 349 A2 | 3/2005 |
| EP | 1 519 581 A1 | 3/2005 |
| GB | 2 329 741 A | 3/1999 |
| JP | 03/153299 | 7/1991 |
| JP | 10145309 | 5/1998 |

| | | |
|---|---|---|
| JP | 11175045 | 7/1999 |
| JP | 2001 218082 | 8/2001 |
| JP | 2001036900 | 9/2001 |
| JP | 2002 304168 | 10/2002 |
| SG | 110144 | 4/2005 |
| WO | WO95/00917 | 1/1995 |
| WO | WO95/13681 | 5/1995 |
| WO | WO98/41008 | 9/1998 |
| WO | WO99/63513 | 12/1999 |
| WO | WO00/20974 | 4/2000 |
| WO | WO02/25822 A2 | 3/2002 |
| WO | WO02/25885 | 3/2002 |
| WO | WO02/65746 | 8/2002 |
| WO | WO03/058376 | 7/2003 |

OTHER PUBLICATIONS

STMicroelectronics—"STDP4020—DisplayPort receiver Data Brief"—7 pages; Dated Sep. 2010.*
STMicroelectronics—"STDP4028—DisplayPort transmitter Data Brief"—7 pages; Dated Sep. 2010.*
"CLUT," http://en.wikipedia.org/wiki/CLUT.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
"Packet," http://en.wikipedia.org/wiki/Packet.
Austrian Examination Report dated Mar. 7, 2008 from Singapore Application No. 200401969-1.
Austrian Search and Exam Report dated Feb. 16, 2007 issued in corresponding Singapore Application No. 200401973-3.
Austrian Search Report dated Mar. 7, 2008 from Singapore Application No. 200401969-1.
Barr, "Copy Protection for High-Definition Baseband Video," Information Technology: Coding and Computing [online at http://ieeexplore.ieee.org/stamp/stamp.jsp?arnumber=844202&isnumber=18266, Aug. 6, 2002.
Bloks, RHJ, "The IEEE—1934 high speed serial bus," Philips Journal of Research, Elsevier, Amsterdam, NL, vol. 50, No. 1, 1996, pp. 209-216, XP004008212 ISSN: 0165-5817.
Chang et al., "Digital Visual Interface," Technology Brief, Dell, May 2000.
Chinese Office Action dated Apr. 4, 2008 in Chinese Application No. 200410047784.X.
Chinese Office Action dated Jun. 27, 2008 from Chinese Patent Application No. 200410038432.8.
Chinese Office Action dated Jun. 27, 2008 in Chinese Application No. 200410038546.2.
Chinese Office Action dated Mar. 28, 2008 in Chinese application No. 200410044503.5.
Chinese Office Action dated Nov. 28, 2008 in CN Application No. 200410071497.2.
Eidson et al., "30.2: HDMI: High-Definition Multimedia Interface," Silicon Image, Inc., Sunnyvale, CA, SID 03 Digest, 2003, pp. 1024-1027.
EPO Exam Report in EP Application No. 04255786.8 dated Jul. 5, 2007.
European Search Report dated Apr. 3, 2008 from EP Application No. 04252205.2.7.
European Search Report dated Mar. 13, 2008 in EP Application No. 04251582.5.
European Search Report dated Mar. 13, 2008 in EP Application No. 04252056.9.
European Search Report dated Mar. 18, 2008 from EP Application No. 04252202.9.
European Search Report dated Mar. 28, 2008 from EP Application No. 04252203.7.
European Search Report dated Mar. 28, 2008 from EP Application No. 04252057.7.
European Search Report dated Mar. 28, 2008 in EP Application No. 04252054.4.
Examination Report dated Jul. 5, 2006 from European Patent Application No. 04255611.8.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Examination Report dated Mar. 1, 2006 from Singapore Patent Application No. 200402057-4.
Examination Report dated Nov. 13, 2006 from European Patent Application No. 04255609.2.
Fairhurst, MPEG-2 Transmission, Jan. 2001, pp. 1-9 from Internet at http://www.erg.abdn.ac.uk/research/future-net/digital-video/mpeg2-trans.html.
Final Rejection mailed Sep. 21, 2007 from U.S. Appl. No. 10/909,103.
High-bandwidth Digital Content Protection System, Revision 1.0, Intel Corporation, Feb. 17, 2000.
High-Definition Multimedia Interface Specification, Informational Version 1.0, Sep. 4, 2003, 52 pgs.
International Search Report dated Jun. 14, 2006 from European Patent Application No. 04252055.1.
International Search Report in related Chinese Application No. 200410044503.5 dated Jun. 29, 2007.
Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
Kasai N. et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
Kobayashi, "DisplayPort Technical Overview," http://web.archive.org/web/20060726222849/http://gnss.com/technology/DisplayPort+Technical+Overview+White+Paper.pdf, Jun. 26, 2006.
Notice of Allowance dated Apr. 25, 2008 from U.S. Appl. No. 10/726,802.
Notice of Allowance dated Jan. 29, 2008 in U.S. Appl. No. 10/726,802.
Notice of Allowance dated Jan. 7, 2009 in U.S. Appl. No. 11/742,387.
Notice of Allowance dated Jul. 8, 2009 in U.S. Appl. No. 10/726,440.
Notice of Allowance dated Jun. 25, 2009 in U.S. Appl. No. 11/747,839.
Notice of Allowance dated Mar. 5, 2008 in U.S. Appl. No. 10/909,103.
Notice of Allowance dated Oct. 1, 2008 in U.S. Appl. No. 10/909,085.
Notice of Allowance dated Oct. 21, 2008 in U.S. Appl. No. 10/762,680.
Notice of Allowance mailed Sep. 24, 2007 in U.S. Appl. No. 10/726,802.
Office Action dated Apr. 2, 2009 in U.S. Appl. No. 10/726,794.
Office Action dated Apr. 3, 2009 in CN Patent Application No. 200410044503.5.
Office Action dated Apr. 4, 2008 in CN Patent Application No. 200410043419.1.
Office Action dated Apr. 6, 2009 in U.S. Appl. No. 10/909,027.
Office Action dated Apr. 9, 2008 from U.S. Appl. No. 10/909,027.
Office Action dated Aug. 1, 2008 in U.S. Appl. No. 10/909,027.
Office Action dated Aug. 19, 2008 from U.S. Appl. No. 10/726,440.
Office Action dated Aug. 29, 2008 from U.S. Appl. No. 11/742,387.
Office Action dated Aug. 6, 2008 from U.S. Appl. No. 10/726,895.
Office Action dated Aug. 8, 2008 from Chinese Patent Application No. 200410045686.2.
Office Action dated Aug. 8, 2008 from Chinese Patent Application No. 200410087460.9.
Office Action dated Jan. 23, 2008 from U.S. Appl. No. 11/747,839.
Office Action dated Jan. 5, 2009 in U.S. Appl. No. 10/726,440.
Office Action dated Jan. 8, 2008 in U.S. Appl. No. 10/762,680.
Office Action dated Jul. 2, 2008 from European Patent Application No. 04252205.2.

Office Action dated Jul. 4, 2008 from Chinese Patent Application No. 200410038545.8.
Office Action dated Jun. 23, 2008 from U.S. Appl. No. 10/762,680.
Office Action dated Jun. 24, 2008 from U.S. Appl. No. 10/726,794.
Office Action dated Jun. 27, 2008 from U.S. Appl. No. 10/909,085.
Office Action dated Mar. 13, 2009 in CN Patent Application No. 200410095171.3.
Office Action dated Mar. 3, 2009 in U.S. Appl. No. 10/726,440.
Office Action dated Mar. 31, 2008 from U.S. Appl. No. 10/726,794.
Office Action dated Mar. 4, 2009 in U.S. Appl. No. 10/726,350.
Office Action dated Mar. 6, 2009 in CN Patent Application No. 200410043419.1.
Office Action dated May 14, 2009 in U.S. Appl. No. 10/726,895.
Office Action dated May 23, 2008 from Chinese Patent Application No. 200410071498.7.
Office Action dated May 26, 2009 in U.S. Appl. No. 11/742,222.
Office Action dated Nov. 2, 2007 from Chinese Patent Application No. 2004100950502.4.
Office Action dated Oct. 16, 2008 in U.S. Appl. No. 10/909,027.
Office Action dated Oct. 21, 2008 from U.S. Appl. No. 11/747,839.
Office Action dated Oct. 31, 2008 in Chinese Patent Application No. 200410095171.3.
Office Action dated Oct. 8, 2009 in U.S. Appl. No. 11/776,411.
Office Action dated Sep. 10, 2009 in U.S. Appl. No. 10/909,027.
Office Action dated Sep. 11, 2009 in U.S. Appl. No. 10/726,441.
Office Action dated Sep. 12, 2008 in CN Patent Application No. 200410044503.5.
Office Action dated Sep. 17 2009 in U.S. Appl. No. 10/726,794.
Office Action dated Sep. 21, 2009 in U.S. Appl. No. 10/726,895.
Office Action mailed Jun. 26, 2007 from U.S. Appl. No. 10/762,680.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
Office Action mailed Nov. 27, 2007 from U.S. Appl. No. 10/726,794.
Office Action mailed Dec. 5, 2006 from U.S. Appl. No. 10/726,802.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Dec. 28, 2007 from U.S. Appl. No. 10/726,895.
Office Action mailed Jul. 9, 2007 from related U.S. Appl. No. 10/726,895.
Office Action mailed Jun. 27, 2007 from U.S. Appl. No. 10/726,794.
Office Action mailed Nov. 26, 2007 from U.S. Appl. No. 10/909,027.
Search Report dated Apr. 2, 2009 in EP Application No. 08153454.7.
Search Report dated Jul. 10, 2008 from European Patent Application No. 08153726.8.
Search Report dated Jul. 2, 2008 in EP Application No. 08155263.0.
Search Report dated Jul. 21, 2008 from European Patent Application No. 08153724.3.
Search Report dated Jun. 30, 2008 in EP Application No. 08155262.2.
Search Report dated Mar. 15, 2006 from European Patent Application No. 04255610.0.
Silicon Image, "High-bandwidth Digital Content Protection," White Paper, Feb. 2000, retrieved from the Internet at http://www.siliconimage.com/docs/SiI-WP-002-A.pdf.
Sung et al., "DVI: A standard for the digital monitor interface," Silicon Image, Inc., Cupertino, CA, 1999, 4 pgs.
Supplemental Notice of Allowance mailed Nov. 6, 2007 in U.S. Appl. No. 10/726,802.
Universal Serial Bus Specification, Revision 2.0, Apr. 27, 2000, p. 143.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
VESA Display Port Standard, Version 1.1, Mar. 19, 2007.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
U.S. Appl. No. 61/179,295, filed May 18, 2009.

* cited by examiner

OPERATION OF VIDEO SOURCE AND SINK WITH TOGGLED HOT PLUG DETECTION

CROSS REFERENCE TO RELATED APPLICATIONS

This patent application takes priority under 35 U.S.C. 119 (e) to (i) U.S. Provisional Patent Application No. 61/179,295 filed on May 18, 2009, entitled "Operation of Video Source with Video Display with Toggled Hot Plug Detect (HPD)" by Kobayashi, which is incorporated by reference herein in its entirety.

TECHNICAL FIELD

The present invention relates generally to communication methodologies and systems enabling networked devices to handle and present data streams in the presence of "hot plug" events. Further power management methodologies for use in networked devices are also disclosed. More particularly, methods, software, hardware, and systems are described for transmitting and receiving audio-video data after hot plug events in a multimedia network.

BACKGROUND OF THE INVENTION

Currently, multimedia networks are relatively uncomplicated in their handling of "hot plug" events. In general, a "hot plug" event is a situation where an active device is plugged into an already active system. This can mean providing a powered "on" device and then plugging it into an operating network device (typically using some sort of communication link). Also, it can mean providing a network of connected devices with a first device in a power on state and then powering up an already connected device. Such hot plugging describes changing or adding components which interact with an operating system or active device. Ideally this should occur without significant interruption to the system. Moreover, such hot plugging should enable the changing or adding of components a network device (in one example, a computer) while it is operating.

In existing devices, such hot plug events flow somewhat seamlessly when a device operating system is fully booted up and operational. However, difficulties begin to arise when a "hot plug" event or an unplug/re-plug event occurs before the device operating system is fully booted up and operational. In such conditions, the interrupt handing mechanisms of many systems and devices are unable to cope with the events. In some cases, unanticipated interrupt events may disrupt systems ill suited to accommodate such events. Moreover, such interrupt handling can cause serious system incompatibility issues between the various components and systems of the device and its peripheral systems. Moreover, when applied to an audio-video network, and when a display is hot plugged into a source device, for a period of time after the hot plug event there can be a significant period of time in which the display cannot display any valid video data. This can of course be problematic in conditions where video data is required to obtain further user input as well a presenting a general inconvenience. For example, when a displayed instruction requests user interaction based. Under these existing circumstances there is an increasing need for methods and systems capable of displaying video data in a number of hot plug situations that are not addressed in current network devices and systems.

While existing systems and methods work well for many applications, there is an increasing demand for display methodologies that enable the display of audio-video data in a wider range of operational circumstance and with far greater capacity to fully enjoy the benefits of modern multimedia equipments, software and devices. This disclosure addresses some of those needs.

SUMMARY OF THE INVENTION

In one aspect, a system or integrated circuit package configured to operate in a multimedia sink device. A package so configured includes a data interface, a receiver module, toggleable hot plug message detection circuitry, link training circuitry, and self-training circuitry. In one approach, the data interface enables interconnection with a data link and receipt of a 8B/10B encoded multimedia signal from multimedia source device connected with the interface through the data link at a data rate comprising one of a finite number of known bit rates. The receiver module is configured to support a received multimedia signal formatted in accordance with a default configuration having a specified set of known characteristics. The toggleable hot plug message detection circuitry can detect when the package is connected with said data link. The circuitry configured such that when detection circuitry is in an on state it detects hot plug events and when the detection circuitry is in an off state it does not detect hot plug events. The link training circuitry is configured to enable sink synchronization with an incoming multimedia signal using a link training process. And wherein the self-training circuitry enables sink synchronization with a received multimedia signal.

In another aspect, the invention describes a system or integrated circuit package configured to operate in a multimedia source device, the package comprising a data interface, toggleable hot plug message detection circuitry, and a default transmission module. The data interface enabling interconnection with a data link and enabling transmission of a multimedia signal through the data link for receipt by a multimedia sink device connected to the interface through the data link. The toggleable hot plug message detection circuitry is configured so that it alternatively can or cannot detect when the package is connected with said data link, depending on a toggle state. When in an on state, it can detect hot plug events. When in an off state it does not detect hot plug events. The default transmission module is configured to send a transmitted multimedia signal in a specified format in the event of a selected hot plug event occurring a dark time period after a VBIOS of the multimedia source is activated but before the operating system of the multimedia source is fully operational and when the toggle is in the on state. The module transmitting the multimedia signal in accordance with one of: a default configuration having a specified set of known characteristics or a last known operational configuration enabling successful multimedia signal transmission to the sink.

In a method aspect, the invention describes operations suitable for communicating a multimedia signal between multimedia devices in a multimedia network. The method includes connecting a multimedia source device with a multimedia sink device and determining whether the hot plug event can be detected. Where a hot plug detector is in an off state and cannot detect hot plug events, then the multimedia signal is sent in the last known format sent. In contrast; where a hot plug detector is in an on state and can detect hot plug events, then the method determine whether to transmit a multimedia signal formatted in either a default configuration (having a specified set of known characteristics) or a last known operational configuration that enable successful multimedia signal transmission to the sink. Once these are determined the method transmits the multimedia signal in the determined one of the default configuration or said last known operational configuration.

In another aspect, the invention describes a computer implementable method. The method embodied on a tangible computer readable media. The computer readable instructions for determining whether the hot plug event can be detected by hot plug detection circuitry when said hot plug event occurs during a dark time period after a VBIOS of the multimedia source is activated but before the operating system of the multimedia source is fully operational. One of detecting or not detecting a connection of a multimedia source device with a multimedia sink device in accordance with an off or on state in hot plug detection circuitry. Where said hot plug event occurs but is not is not detected, said multimedia signal is sent in the last known format. Where said hot plug event occurs and is detected, determining whether to transmit a multimedia signal formatted in one of a default configuration having a specified set of known characteristics or a last known operational configuration enabling successful multimedia signal transmission to the sink. Once these instruction are processed, then method processes instructions for transmitting the multimedia signal in the determined one of the default configuration or said last known operational configuration General aspects of the invention include, but are not limited to methods, systems, apparatus, and computer program products for enabling message transmission in multimedia device networks. Aspects include system configuration and dynamic adjustment of messaging formats based on hot plug events as well as other circumstances.

The invention and the advantages thereof may best be understood by reference to the following description taken in conjunction with the accompanying drawings in which.

Figure 9A:
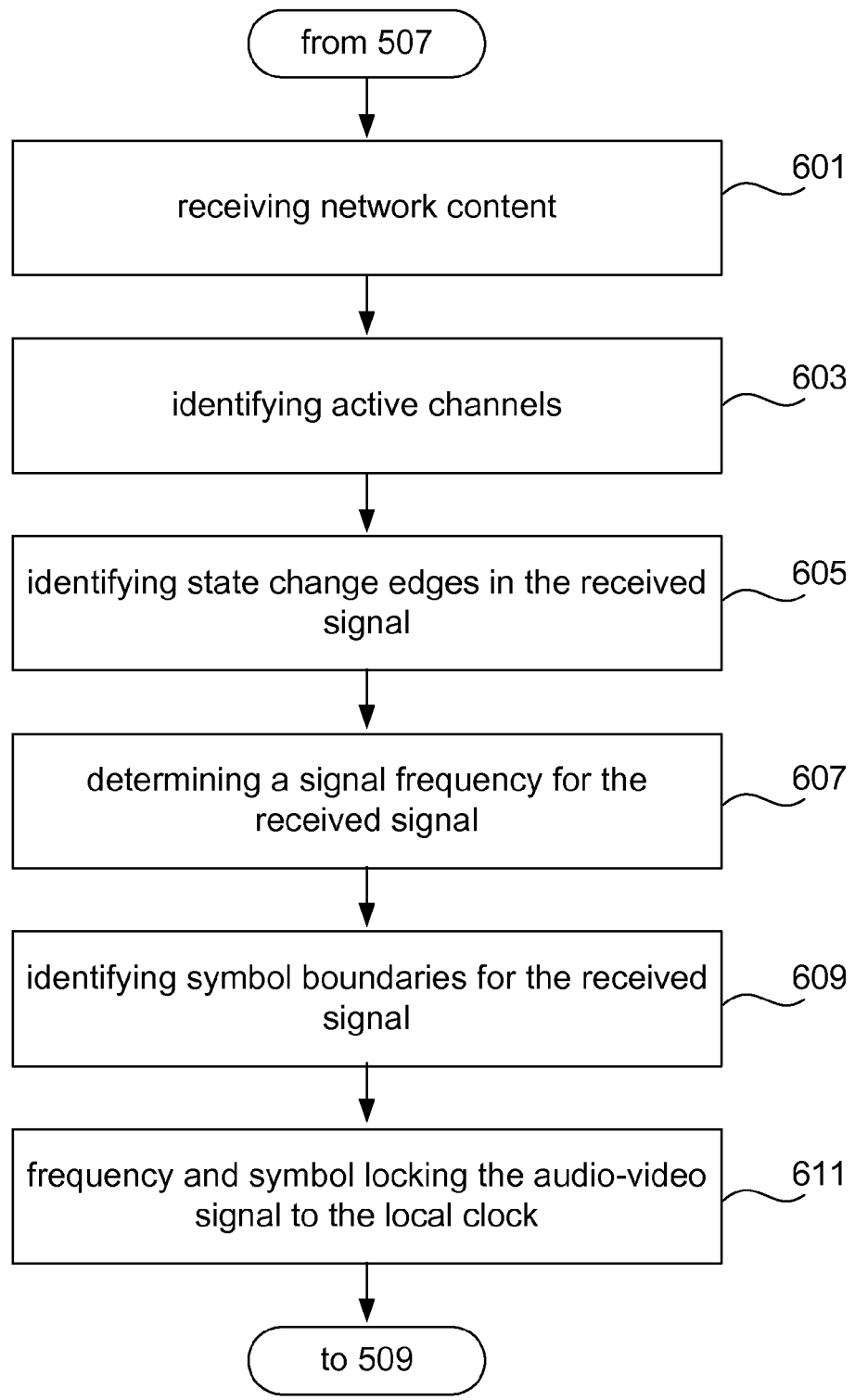
FIG. 9A is a flow diagram describing an embodiment for self-configuring a multi-media network in accordance with the principles of the invention.
Figure 9B:
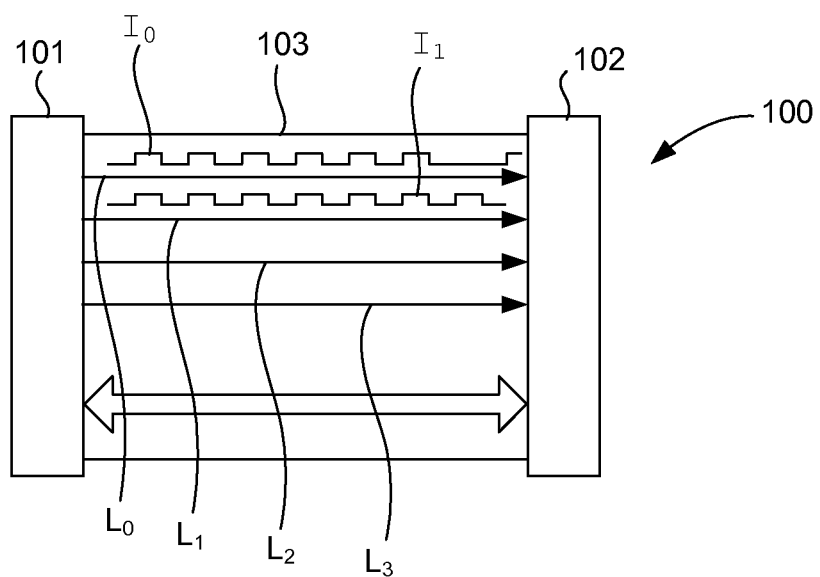

FIG. 9B presents another simplified network embodiment of a multi-media network transmitting an audio-video signal in data channels of a data link.

Figure 9C:
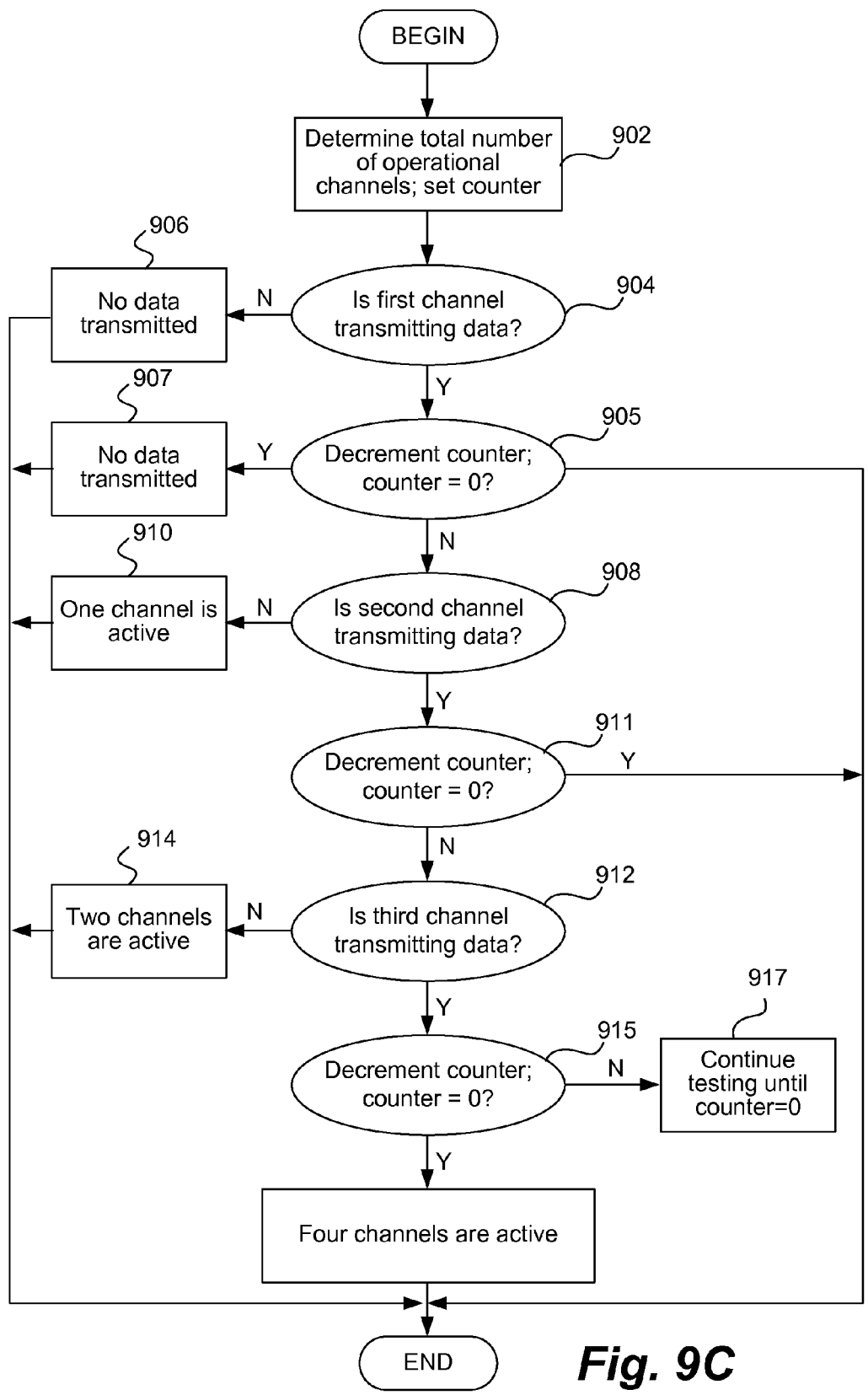

FIG. 9C is a flow diagram describing an embodiment for determining channel activation state in a multi-media network in accordance with the principles of the invention.

Figure 9D:
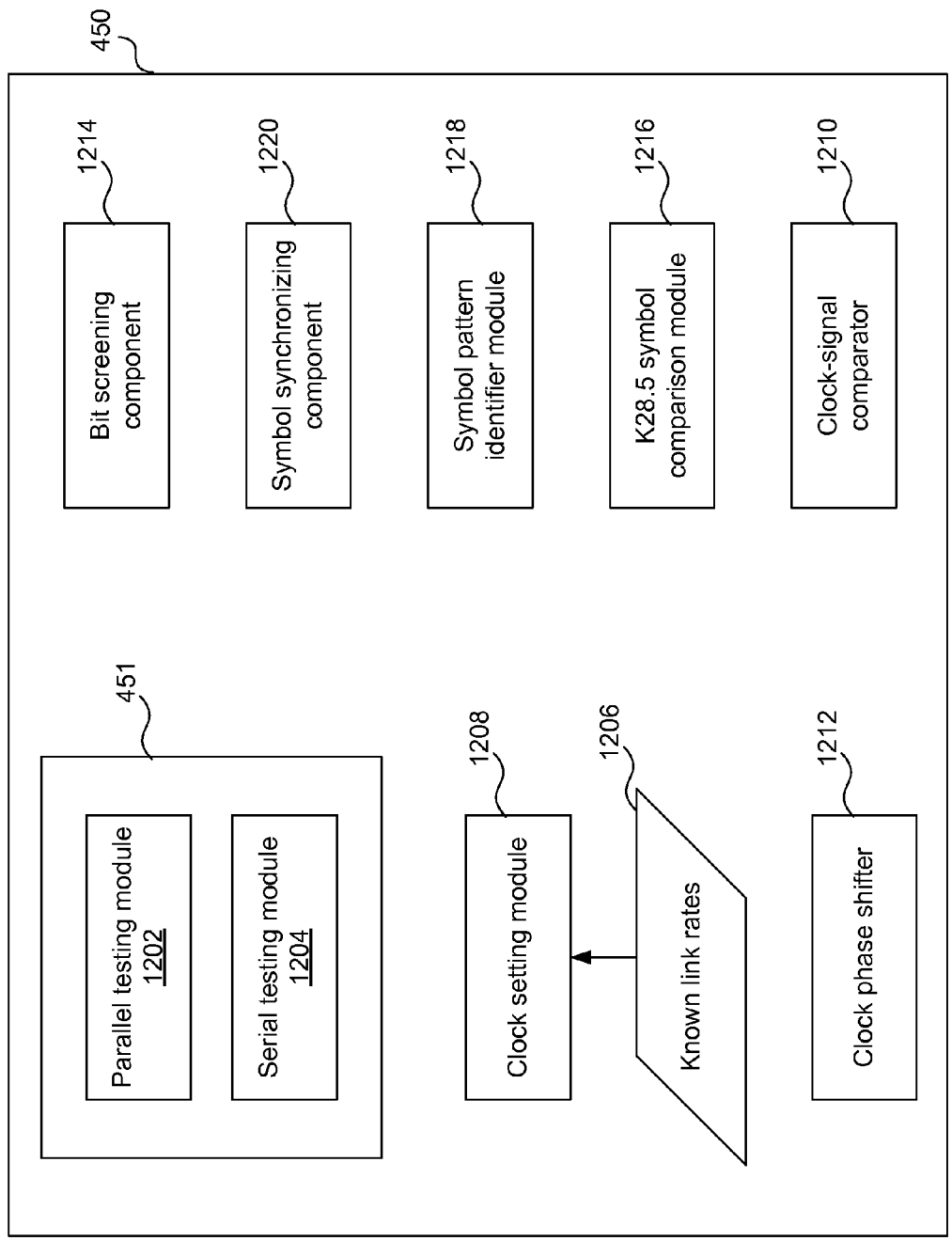

FIG. 9D is a generalized schematic depiction of a multimedia device embodiment suitable for enabling self-configuration and also capable of using an unstable local clock in accordance with the principles of the invention.

Figure 10A:
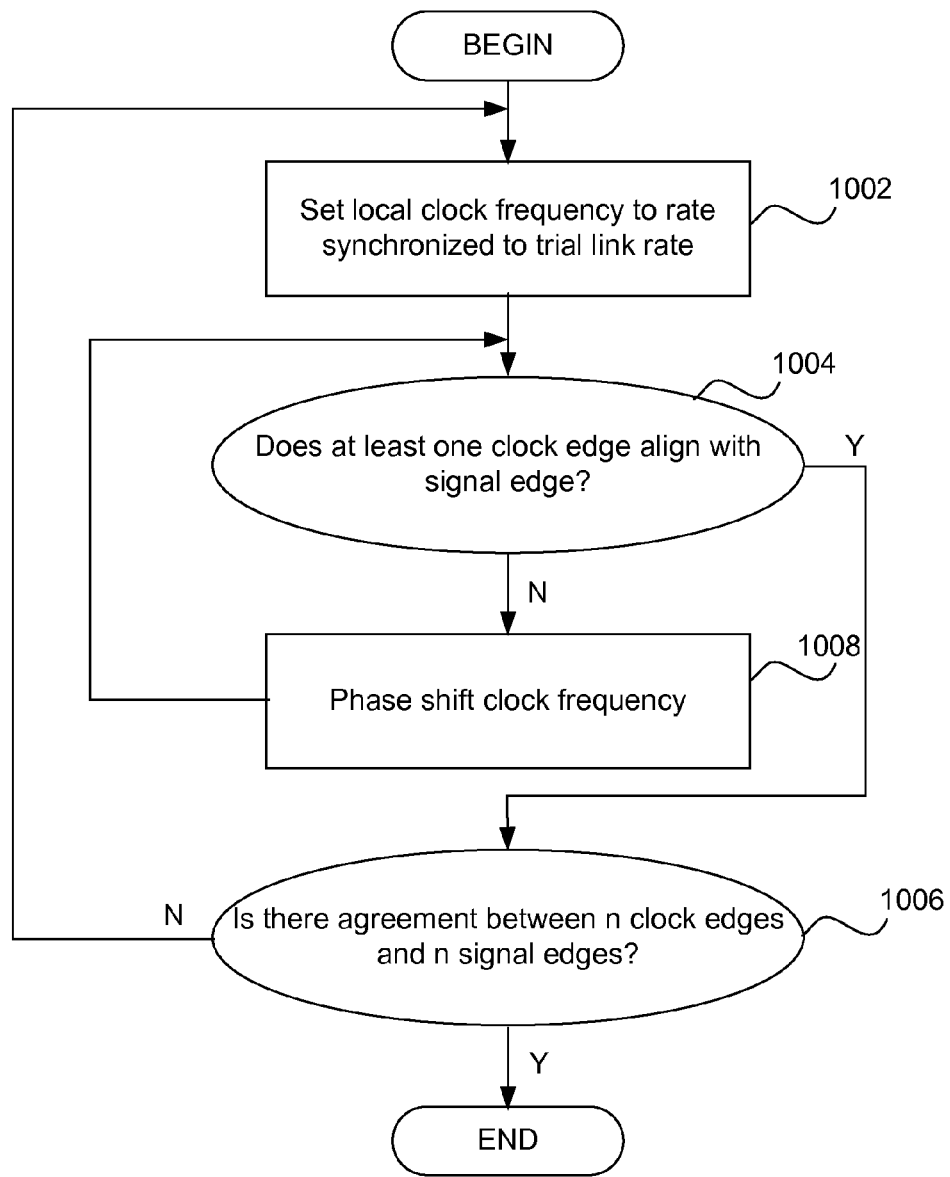

FIG. 10A is a flow diagram illustrating another method of achieving self-configuration in accordance with the principles of the invention.

Figure 10B:
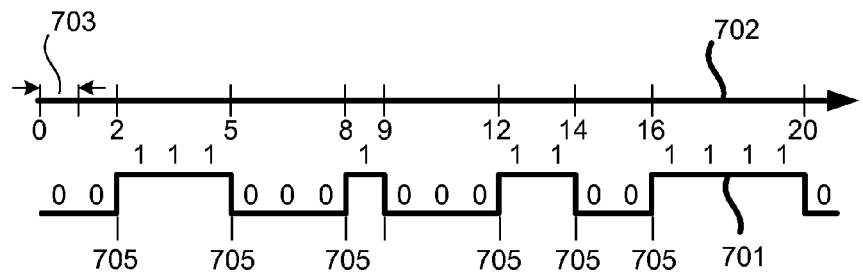
Figure 10C:
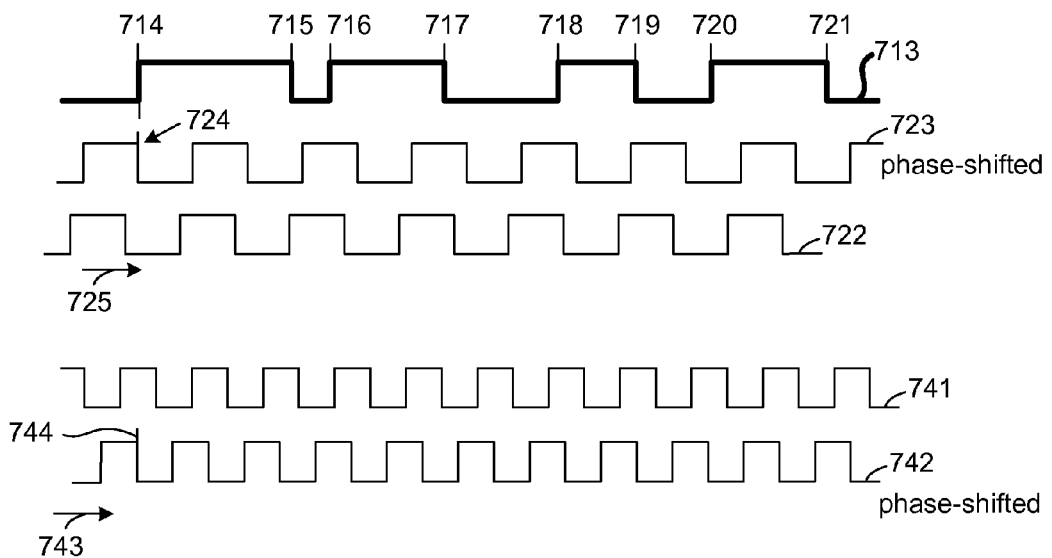

FIGS. 10B and 10C are timing diagrams illustrating processes for frequency determination and frequency locking in accordance with the principles of the invention.

Figure 11A:
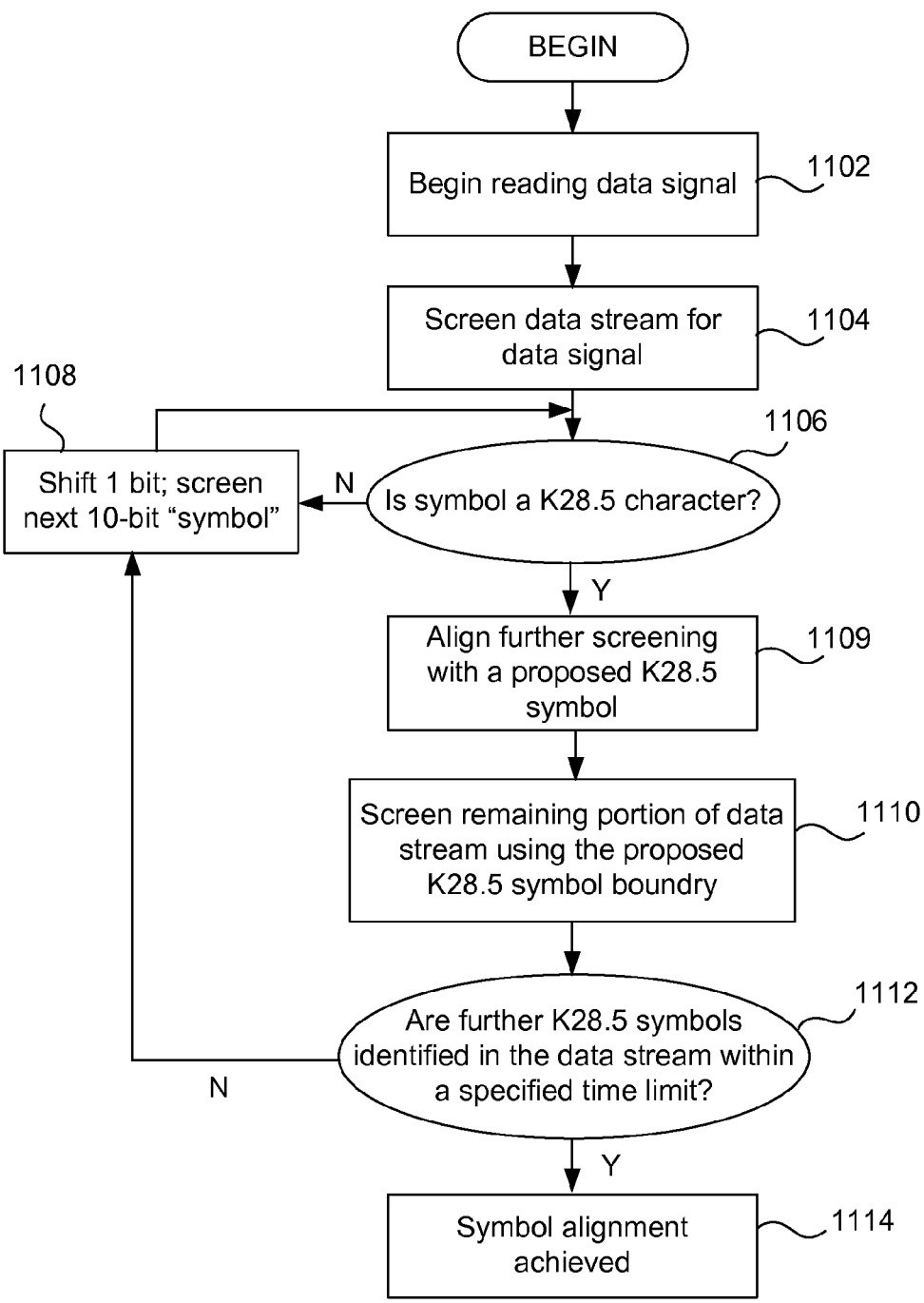
Figure 11B:
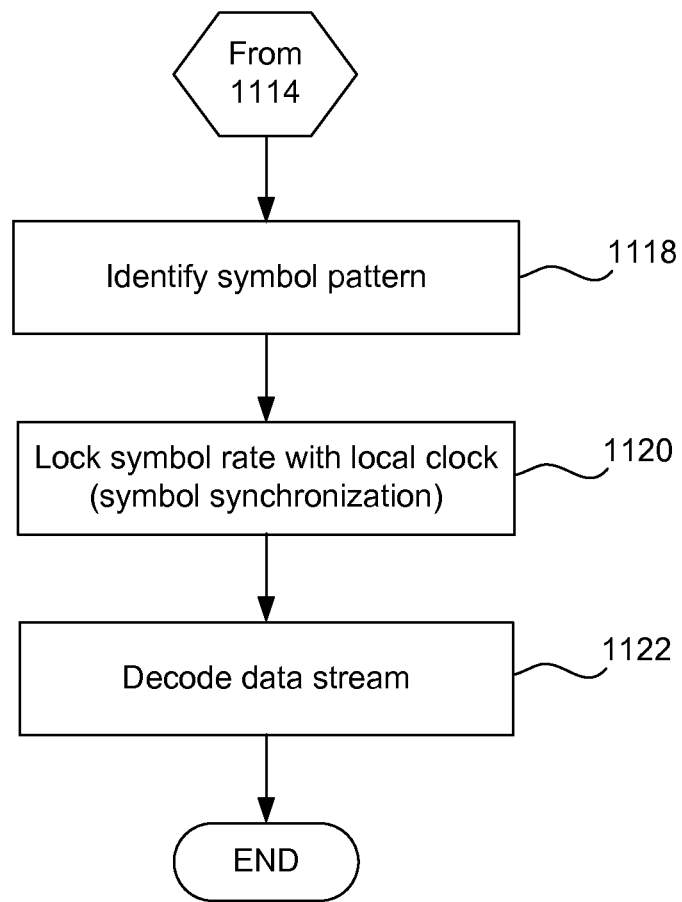

FIGS. 11A-11B are flow diagrams illustrating a process of symbol boundary identification and symbol synchronization in accordance with one embodiment of the invention.

Figure 12:
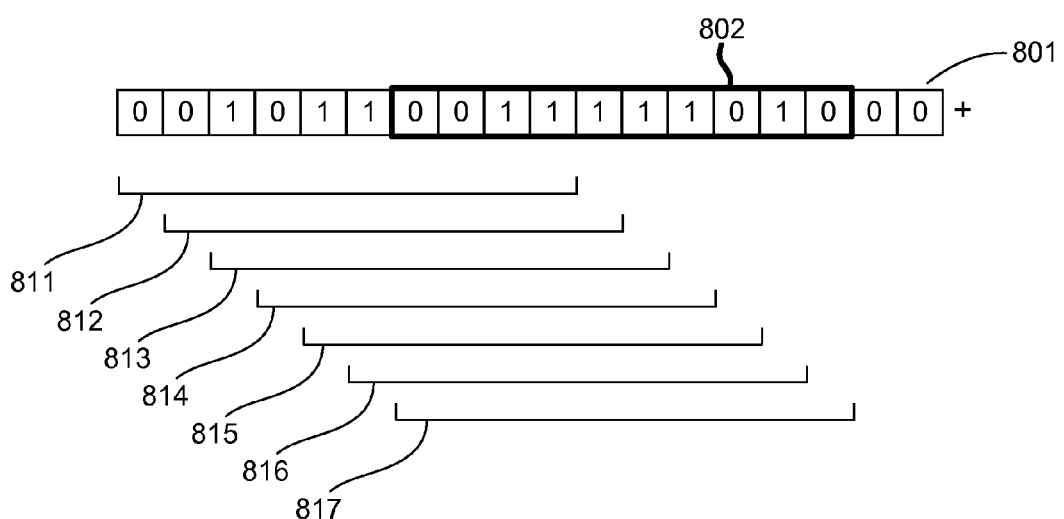

FIG. 12 is a timing diagram illustrating processes for alignment with a K28.5 symbol in accord with one embodiment of the invention.

In the drawings, like reference numerals are sometimes used to designate like structural elements. It should also be appreciated that the depictions in the figures are diagrammatic and not to scale.

DETAILED DESCRIPTION OF EXAMPLE EMBODIMENTS

Reference is made to particular embodiments of the invention. One example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Aspects of the invention pertain to methods and systems for enabling multimedia data transmission and display in the absence of full link training and the implementation of self-configuration to enable multi-media data transmission and display after hot-plug events.

Figure 1:
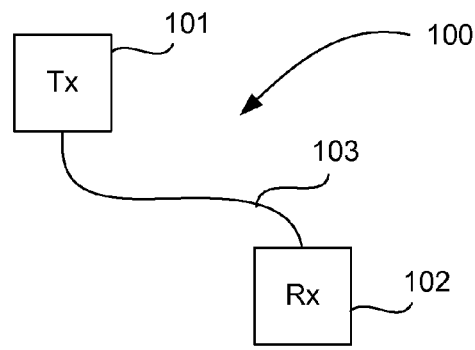
FIG. 1 illustrates a simplified network embodiment of a multi-media network in accordance with the principles of the invention.

In ordinary operation of multimedia systems a number of sink devices, source devices, as well as other network devices (routers, splitters, etc.) are linked together in a multimedia network. FIG. 1 illustrates a highly simplified example multimedia network 100 comprising a source device 101 and a sink device 102 linked by a data link 103.

Example source devices 101 include, but are not limited to any device capable of producing or transmitting multimedia signal. In embodiments of this invention the signal comprises multimedia data that shall be interpreted broadly. Moreover, throughout the specification and claims multimedia and audio-video signal shall be used interchangeably and have the same meaning. Accordingly, such multi-media content can include, but is not limited to, video, still images, animation, text, audio (sound, music, etc.) and interactive content, as well as combinations of all of the foregoing.

Again, in general, source devices 101 are those devices that capture, generate, or transmit multimedia content. Particular source devices 101 include, but are not limited to set top boxes, DVD players, cameras, video recorders, game platforms, computers, HD video devices, VCR devices, radio, satellite boxes, music players, content capture and content generation devices, and many other such source devices beyond those referenced above.

The network 100 can further include one or more sink devices 102. As used herein, example sink devices 102 can comprise any device capable of receiving and/or consuming multi-media content. For example, particular embodiments can include, but are not limited to, audio devices, display devices, stereo equipment, receivers, game devices, and many other such audio-video sink devices.

Other network devices applicable to this invention include, but are not limited to multimedia hubs, splitters, concentrators, switchable devices with many inputs and fewer outputs, replicators, concentrators, and many other types of branch devices that can link various combinations of components together. These branch devices modernly are mixed with standard sink/source capabilities and so are well suited to applications of this invention. It should be noted that many devices combine traditional source and sink functionalities, and also such network devices can include a wide range of devices combining other of these functions.

During operation of the networked systems it may at some time become necessary or desirable to "hot plug" various components. As used here "hot plugging" describes changing or adding components which interact with another network device in a power on (or active) configuration. In general, "hot plugging" is the act of connecting a powered device into another network device or the act of powering on a connected device. In one example, a powered second device is plugged into another device (first device). As just indicated, hot plugging also describes an event where the second and first devices are already connected (using for example, a data link) and then the second device is switched on. The "hot plug" being the switch on event. For reasons described later, these events are made more important if the first device is in the power on state during the event.

Additionally, hot plug events include unplugging a device and then re-plugging it (hot plugging being the re-plugging event). For example, when a sink device 102 (for example, a display device) is connected to an operating source device 101 (a computer or DVD or other such device) a hot plug event occurs. In another hot plug event, a first device connected with one port of a second device, then the first device is unplugged from the port of the second device and then plugged back in to another port of the second device.

Under most operating conditions such hot plug events are commonplace and somewhat unremarkable as the operating system of the device 101 is configured to anticipate and handle such events. Commonly, a hot plug detect mechanism enables both devices to become aware of the hot plug event. For example, in one case an active first device is plugged into a second device. Upon being plugged in, the first device can send an interrupt signal which is acknowledged by interrupt handling mechanisms of the second device. The situation can become more complicated when the hot plug detect mechanisms are disabled in some way or not present at all. For example, when an active display is plugged into a source, and the display does not send a hot plug interrupt signal. Thus, in certain circumstances such hot swap or hot plug events can prove troublesome.

Figure 2:
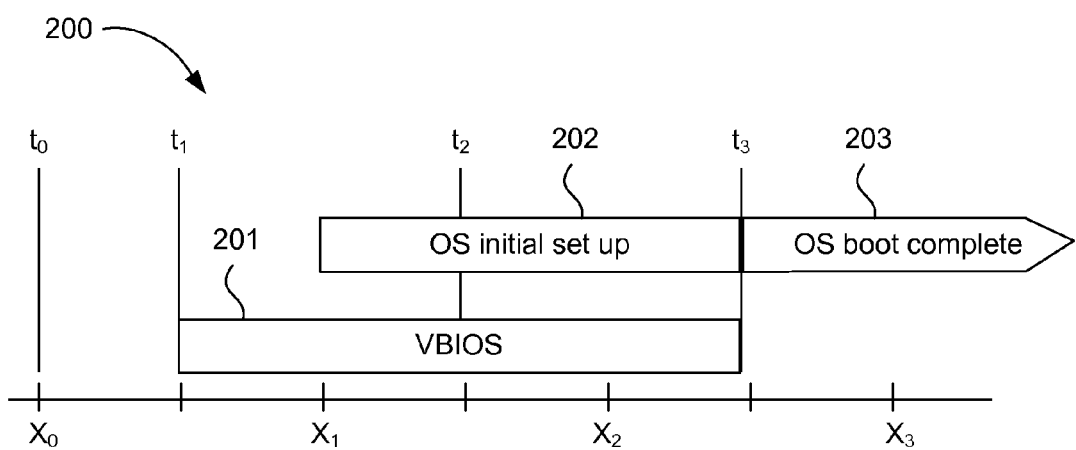
FIG. 2 illustrates a timing diagram useful for illustrating problems and solutions in accordance with the principles of the invention.

FIG. 2 is a timing diagram 200 that illustrates, in a very general way, a start up cycle for an example electronic device (e.g., 101) and the effects of various hot plug events. This representative example uses a network 100 such as that of FIG. 1. In this example, the device 101 (source) will comprise a computer device and device 102 (sink) will comprise a display device. For purposes of illustration four different time markers ($t_0$, $t_1$, $t_2$, $t_3$) are illustrated. Time $t_0$ is an arbitrary time used in an explanatory discussion of a start up process for device 101. At $t_1$ the device 101 is powered on. Subsequently the Video Basic Input/Output System (VBIOS) of device 101 initiates operation 201. At $t_2$ the main operating system (e.g., LINUX®, Windows®, Darwin®, and many others) of the device 101 begins a boot up process 201. At $t_3$ the main operating system is fully booted up 203 and begins operation. As such, after $t_3$ the main operating system takes over operation of the device 101.

Additionally, the diagram illustrates a number of power on or hot plug "events" ($x_0$, $x_1$, $x_2$, $x_3$). The events ($x_0$, ..., $x_3$) each identify a moment of occurrence of a hot plug event for device 102 (i.e., the moment device 102 is both connected with device 101 and in a power on state).

To explain, in this example, at $t_0$, the device 102 is connected with the device 101 and is powered on at $x_0$. Thus, the hot plug event $x_0$ occurs prior to the powering on of the source device 101 at $t_1$. This is a common default state and when the device 101 is powered up the VBIOS 201 of the device 101 recognizes the connected and powered sink device 102. Accordingly, at $t_1$ the VBIOS of the source device initiates the standard start up and initiation protocols enabling data to be transmitted to the sink 102. During a typical start up routine the VBIOS operates the drivers and systems enabling correct operation of the sink 102 until the operating system fully boots up 203 and begins to manage the device 101 operation (and the sink 102). Ordinarily, the VBIOS is capable of operating and interacting with the sink device 102 and performing the necessary configuration prior to operating system boot without complication.

At $t_2$ the operating system begins to boot up 201 and the VBIOS is still handling the majority of system interrupts and system calls. This boot up beginning period 202 is also discussed herein as a "dark period" where the operating system is not fully able to operate the device 101. After the dark period, at time $t_3$, the operating system is fully booted up 203 and the ordinary operation of the operating system occurs.

Referring again to FIG. 2, events $x_1$, $x_2$, $x_3$, are briefly described. The event $x_3$ describes a hot plug event occurring after the operating system has become fully active or is operating in a safe mode. During this period, after a hot plug event $x_3$, the source 101 will receive a hot plug detect message (HPD) sent by the sink 102 upon connection. During the operation of the operating system (203) the operating system receives the HPD message and acknowledges that it has received the HPD. Thereafter the source transmits link training information along with associated audio-video signal. This enables the sink to initiate a link training protocol that enables the sink 102 to reconstruct the data streams sent from the source 101 through the data link 103. The process of link training will be described elsewhere in this application. The methods and systems required to do such link training are disclosed in other patents and will not be described in detail here.

With continuing reference to FIG. 2, events $x_1$ & $x_2$ are briefly explained. The event $x_1$ describes a hot plug event that occurs after the activation of the VBIOS 201 after source 101 power on ($t_1$). The operating system has not become active at this point. As indicated above, the VBIOS system works reasonable well when the sink is powered on and is connected prior to the start of the VBIOS (i.e., before $t_1$ for example at time $t_0$). The VBIOS operates the sink 102 with VBIOS drivers and configuration systems. However, if a hot plug event occurs after the initiation of the VBIOS the VBIOS interrupt handling systems are not suitable for enabling effective configuration of the source device to handle the newly hot plugged sink device. In particular the VBIOS system is not capable of responding to the HPD message received from the sink and cannot initiate or operate link training. Moreover, the VBIOS interrupt handling may result in a wide array of system incompatibility problems that can yield unpredictable and undesirable results. Significantly, this situation will prevent the display of an audio-video signal sent by source 101 to display 102.

As stated above, in response to hot plug event $x_1$, and during the initial operation of VBIOS 201, the source 101 will receive a hot plug detect message (HPD) sent by the sink 102. However, during this period (201) the VBIOS receiving the HPD cannot recognize the HPD message sent by the sink. Moreover, it cannot respond to link state changes in the link 103 (such as occur during a hot plug event). Accordingly, during period 201 the source cannot provide link training information to the sink device. Absent this information, the sink cannot be configured to properly display the content at the sink 102. This is a shortcoming in the present state of the art.

With further reference to FIG. 2, event $x_2$ is briefly explained. The event $x_2$ describes a hot plug event that occurs after the start up (at $t_2$) of the operating system (202) but before it becomes fully operational (the dark period). Thus, as with event $x_1$, the operating system has not become active at this point. As indicated previously, this interrupt is still handled by the VBIOS system and suffers from the same limitations. In particular, the VBIOS interrupt handling systems are not suitable for enabling effective link training, responding to the HPD message, and cannot sense state changes in the link 103. As before, this situation will prevent the display of video signal sent by source 101 to display 102 because the sink has not received configuration information from the source (indeed, the source does not even know to send the information) and cannot be configured. Accordingly, during dark period 202, after a hot plug event $x_2$, the source 101 will receive a hot plug detect message (HPD) sent by the sink 102. However, during this dark period 202 the VBIOS receives the HPD and cannot recognize the HPD messages sent by the sink. Accordingly, as described before, link training information will not be provided to the sink and the data cannot be properly displayed at the sink 102.

Default Mode

Additionally, the system becomes complicated when the hot plug detect mechanisms are not performing correctly. For example, where the source does not have an interrupt handler in operation (or at all) or when the sink device does not have an interrupt message transmitter (or where it is inoperative) that can inform a source device that a hot plug event has occurred. Thus, in the absence of such a hot plug detect mechanism, the source and sink cannot properly communicate. Accordingly, it is difficult for the source and sink to properly configure data and device attributes to properly handle data. In one specific case, a display device (sink) cannot properly display video data in the absence of link training or the receipt of other configuration data from the source. These problems are exacerbated when they occur in the "dead" period described above.

Figure 3:
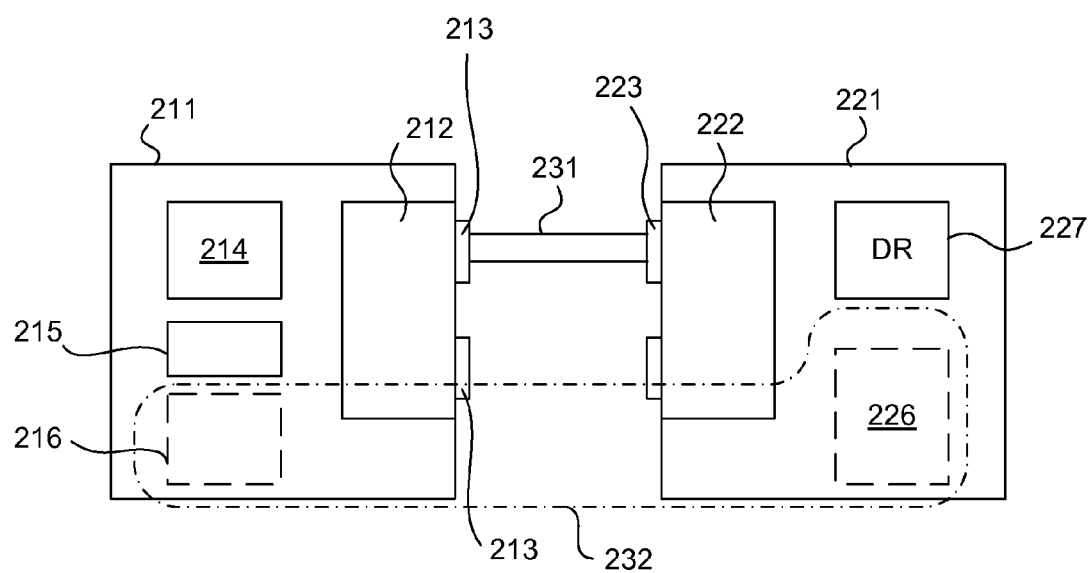
FIG. 3 illustrates a simplified network embodiment of a multi-media network transmitting an audio-video signal in data channels of a data link.

FIG. 3 provides a generalized representation of a simplified cross platform packet based digital video data transmission system 300 in accordance with an embodiment of the invention. A source device (transmitter) 211 is connected with a sink device (receiver) 221 using a data link 231. In this example, the source can comprise a video source 211 with a display device serving as the sink 221. The data link 231 can include a plurality of separate uni-directional physical data channels for carrying video data. Typically, the number of channels is 1, 2, or 4 but is not limited to such. The source packetizes data stream(s) into a number of data packets that are formed into one or more data streams that are introduced into data channels of the link. Further details of link architecture are explained below.

To continue, a source 211 includes a data interface 212 that enables connection with and data transmission through the link 231. In this embodiment, the interface 212 includes a plurality of data ports 213 for connection with a data link 231. Also, the source includes default transmission module 214 enabling the transmission of data in one of two different modes (as will be discussed later in this patent). Also, the source 211 includes memory 215 which can store, among other things, configuration data concerning known operational configuration parameters for multimedia signal data transmitted successfully to an associated sink device (like sink 221).

Briefly, a sink device 221 includes an interface 222 that can have one or many data ports 223. The sink can include a receiver 227 for receiving data. In one embodiment the receiver 227 comprises a default receiver configured to accommodate a specified data format sent from a sink device. The details of this receiver embodiment will be disclosed in greater detail below.

It should be pointed out that the source system can be enabled by a chipset, system on a chip, or general circuit system comprising the interface and ports 212, 213, the default transmission module 214, the memory 215, and also optionally the hot plug interrupt handler unit 216. Similarly, the sink system can be enabled by a chipset, system on a chip, or general circuit system comprising the interface and ports 222, 223, the default receiver module 227, and also optionally the hot plug interrupt generator 226. It is to be pointed out that these systems can be further augmented through the addition of other source/sink components. The processes of this invention, such described below, can be implemented by the circuitry of respective source and sink devices. Also, the processes of this invention, such described below, can be stored on computer readable media for execution by suitable devices. Such computer readable media can comprise tangible media and can be specifically implemented as firmware installed on respective source and sink devices.

Additionally, the source and sink can be configured with a hot plug detection mechanism or system, collectively and schematically shown as 232. The source can include a portion 216 of a hot plug detection system 232 system. The system 232 can include a complementary portion 226 in the sink device 221. In one typical example, the system can include an interrupt generator (226) which sends an interrupt signal through a connector (which can include link 231) to an interrupt handler (216) of the source. Together these form a hot plug detector (HPD) that signals that a hot plug event has occurred.

The inventor points out that in accord with an embodiment of the invention, the system 232 does not provide suitable hot plug detection. This can mean that the sink does not include an interrupt generator 226, or that the generator 226 is inoperative. Some sink devices simply do not provide the capability. This can also mean that the source does not include an interrupt handler 216 or that the handler 216 is inoperative. In general, the system 232 is non-operative for providing notice of hot plug events.

Thus, in ordinary operation, the sink sends data to the source in accord with a set of data transmission parameters. Such parameters can be established using link training, handshake protocols, or other means. In one embodiment of the invention, when a successful link connection is made enabling data to be transferred from source to sink, it will be established using a specified link configuration that enables source/sink communication. This specified link configuration can be specified by a number of operational parameters. For example, a number of channels can be specified, the link rate (a data rate at which data is to be transported through the link) can be specified; a resolution of display format such as 480× 640 or other resolution can be specified. These operational parameters enable data transfer to the sink such that the received data can be displayed in a proper format by a display device. This data can be stored in the memory 215 of the source device 211.

The invention concerns conditions whereby, when a hot plug event occurs (say by plugging an active sink device 221 into the source 211), the HPD system does not acknowledge the event. For example, if the sink does not have a (or has a non-operative) hot plug interrupt generator no interrupt signal can be sent to the source in response the event. This is one example of a phenomena the inventors call "hot plug detect not asserted". The sink can not assert the interrupt signal. This may be the case were older legacy equipment is being used or equipment configured in a different format that does not support compatible hot plug detection circuitry.

Under such conditions, data sent by a source cannot be displayable by a sink device. Under ordinary conditions (before the VBIOS begins operation or after the OS begins to operate) the system can train the link to enable communication of video data and display. However, during the dark period (after VBIOS begins operation and before the OS begins operation) the source has no way to interrogate the sink to ascertain correct configuration data and so is probably not going to send display data in the correct format. This means that the display device 221 will not be able to properly display the video data.

Figure 4:
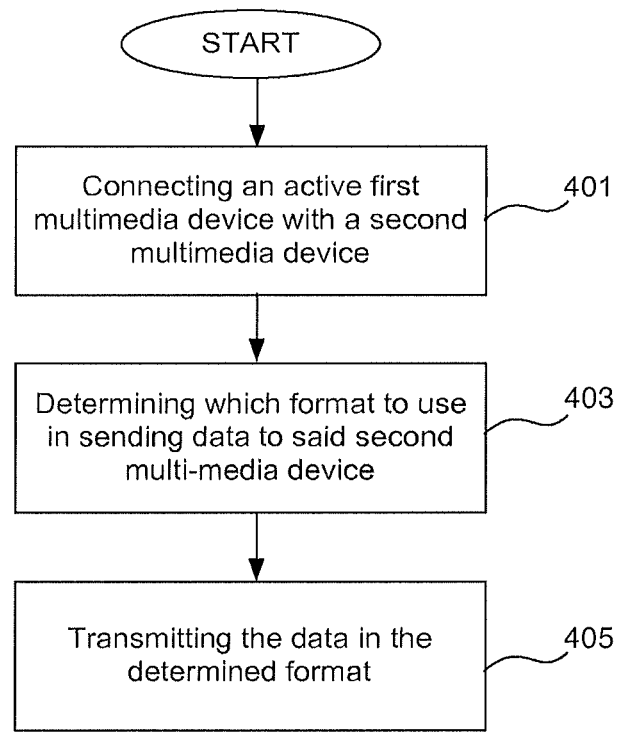
FIGS. 4 and 5 are flow diagrams illustrating one approach to handling hot plug events in a multi-media network in accordance with the principles of the invention.

The invention offers a number of solutions to this problem. FIG. 4 provides a flow diagram that provides a general illustration of an embodiment for handling this situation.

To begin an active first multimedia device is connected with a second multimedia device (Step 401). This can involve plugging a first active device into a second device. For example, the two devices are plugged together and then one device is turned on, thereby becoming the active device generating the hot plug event. Also, a first active device can be unplugged from a second device and then plugged back into in to generate the hot plug event. Also, a first active device can be unplugged from a specified input port of a second device and then plugged back into a second port of the second device. Alternatively, the second device can be unplugged from a specified input port of the first active device and then plugged back into a second port of the first active device. These and other events can generate a hot plug event. An example of a typical event is when an active display (or other sink) is connected with a video source.

In one particular embodiment, the hot plug event occurs while the source is operating in the dark period after the initiation of the source VBIOS but before the operating system has become fully active. During this period, the VBIOS system does not handle interrupt events (such as a hot plug interrupt message) very well and cannot conduct link training (except at the beginning of the VBIOS start up cycle) and so display of data can be problematic.

Importantly, the described method is operable whether the hot plug event is detected or not. For example, where the sink device has not asserted its hot plug detection system i.e., when a hot plug interrupt signal is not generated and transmitted to the source. One example of such a condition is where the sink does not have a hot plug interrupt generator, or such a system is non-operative or turned off. It may also extend to conditions where the absent or non-operative hot plug detection components are those of the source device.

Under such conditions, a source of the present invention determines a format for sending data from the first multimedia device to the second multimedia device (Step 403). In typical example, this means determining which format to send source data to a sink device. The formats here are one of a first default configuration comprising a specified set of known characteristics or a second configuration that specifies a last known operational configuration that enabled a previous successful multimedia data transport to the sink. This feature will be explained in some greater detail below, with respect to FIG. 5.

Once the format is determined, the source sends the data in the determined format (Step 405). This feature will be explained in some greater detail below, with respect to FIG. 5.

Figure 5:
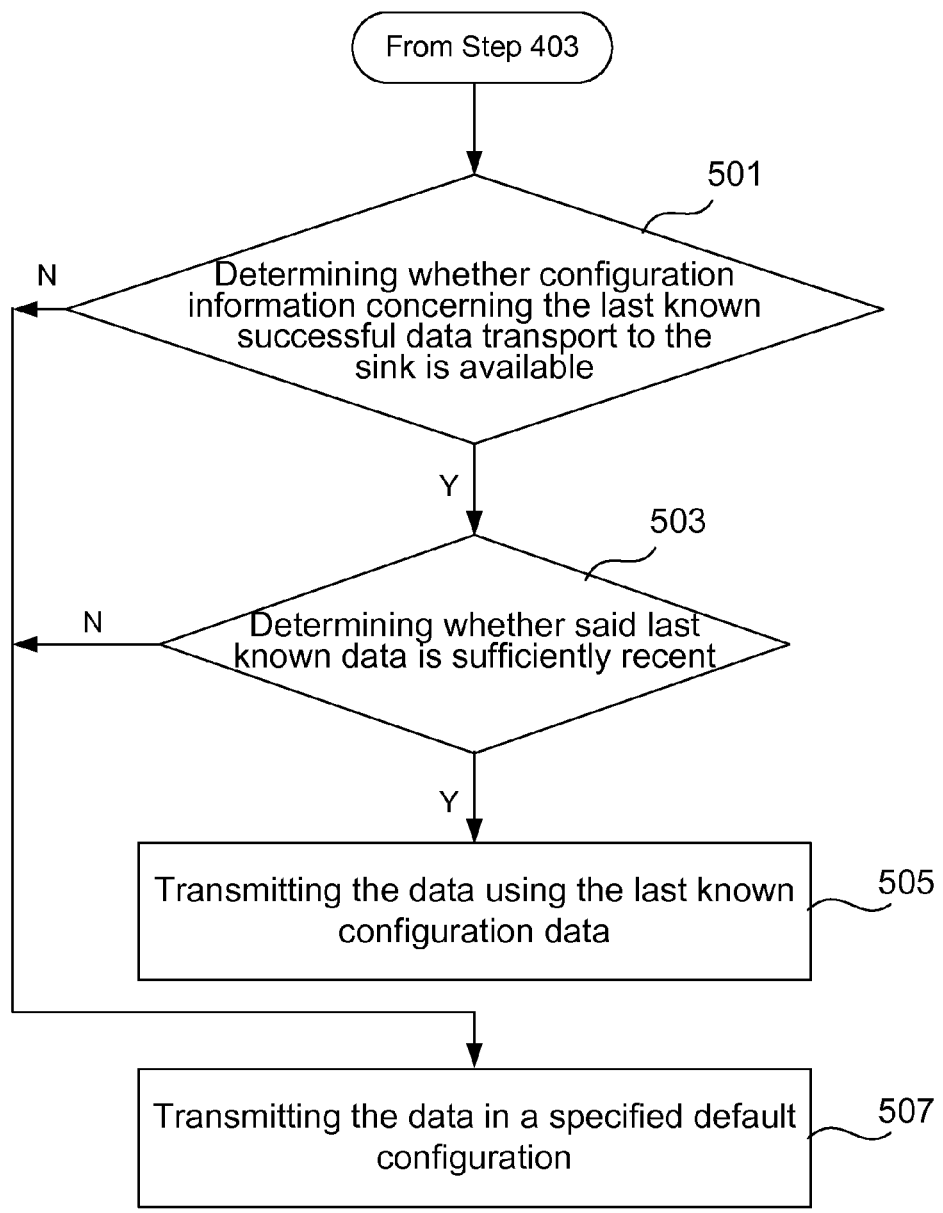

FIG. 5 is a flow diagram illustrating an approach for accomplishing Steps 403, 405. FIG. 5 begins at Step 403 the determination of which format to use. In this embodiment, there are two possibilities for data transmission formats. A first format is a previously used configuration format that successfully enabled data transport to a sink device. In one particular embodiment, the previously used configuration format that successfully enabled data transport to the sink device at issue presently. For example, if the source had sent data to a sink in accordance with a specified format and said transport was successful, said format may be a good candidate for transmission to the sink at issue. Alternatively, a default format having a specified set of known characteristics. In some embodiments, this latter case can be the only method under which a sink operates.

Thus, a determination is made as to whether there is configuration data available for use in formatting data for transport to the sink (Step 501). Accordingly, using the example of FIG. 3 the memory 215 of source 211 can contain the configuration data used to achieve the last success transport of data from the source to a sink. Additionally, in one embodiment the memory 215 can contain the configuration data used to achieve the last success transport of data from the source to the sink that is now hot plugged to the source. As can be appreciated by those of ordinary skill, there may be no such data available. For example, the hot plugged sink is a completely different sink which has not previously been hot plugged before or has not yet had data transmitted to it previously, is a likely candidate for such unavailable data. Under such circumstances the data may not be available to configure the data stream. In such case, the data will be transmitted in accord with a default format as specified with respect to Step 507, which is discussed below.

The data may also be available. For example, being stored in the memory 215 of the source 211 or some other memory location accessible to the source. A few examples where such data may readily be available are a recent data transport to the sink now hot plugged. Another candidate is a unplug/replug event. Such an event occurs where the sink is unplugged from the source and then plugged back in to the source a short time later. This recent configuration data is likely still available. Another such an event is when so-called "port switching" occurs. In such an event the sink is originally plugged into a first port of the source and then is unplugged and replugged into a second port of the source device. In another related case, the source is originally plugged into a first port of the sink and then is unplugged and replugged into a second port of the sink device. If successful data transport between the sink and source were previously achieved, the memory can still hold the configuration data. These situations are all good candidates for recalling and using previous configuration data.

Thus, the source must determine if the previous configuration data that was used to establish a prior good connection between the source and the now hot plugged sink device is sufficiently recent to be reliable in the instant connection (Step 503). For example, the source can be set to have a time out period, wherein if the sink is hot plugged into the source before the end of the time out period (which begins when the previous communication between the source and said sink ended) the old previously obtained configuration data can be used to set up the link between the source and the hot plugged sink. An examples time out period is less than about 30 seconds. Another example range can be about 300 ms (millisecond) to about 5 seconds. Of course, the inventors posit that much longer periods can be used.

If suitable configuration data is available (Step 501) and is sufficiently recent (reliable) (Step 503) the data can be transmitted using the configuration data for the last known operational configuration that successfully enabled transport between the source and sink (Step 505).

In one non-limiting example, the set of parameters that can be used to describe the recent successful configuration status of a prior source sink link can include, but is not limited to, number of data channels used to transport data in the link, the bit rate used to transport data in the link, and a resolution used to decode the prior multimedia data. Other parameters can be used as well. For example, an initially connected sink device is undergoing a successful data transfer over four data channels of the link at a bit rate of 10.8 Gbps and is displayed with a resolution of 1280×960. If the sink is unplugged is reconnected within the timeout period, the same parameters can be used and will likely provide excellent display.

To continue, where either there is no prior configuration data available (Step 501) or where it has been too long since the data has been used (past the timeout period) (Step 503) then a default configuration can be used to configure the data (Step 507). Such a default configuration has a specified set of known set of known characteristics specified. These parameters can be set to any value. However, the inventors believe that using a set of parameters having a minimum of complexity and without demanding too much capacity has the greatest backward compatibility and enables the greatest functionality of the methods and apparatus of this invention. Also, said default configuration can be set to a lowest standardized level. In one particular example, the default parameters than can be used to describe the data transmission configuration sink link can include a link configured to accommodate data transfer using a single data channel of the link at a reduced bit rate of 1.62 Gbps and is displayed with a resolution of 640×480. Thus, if a sink is hot plugged this level of data configuration provides an excellent chance of being able to present video data in a viewable manner. It also demonstrates a great range of applicability to many devices. If the sink is unplugged but is reconnected within the timeout period, the same parameters can be used and will likely provide excellent display.

It should be noted that for this to work properly, the sink device 221 includes a receiver 227 specifically capable of handling the received data in the default format. So the sink must support this minimum capacity (e.g., single channel, reduced bit rate 1.62 Gbps, and default resolution of 640×480).

Another approach for overcoming the previously described limitations is described as well. These embodiments of the invention will be explained below in greater detail in accord with FIGS. 6-12. It is to be pointed out that the inventor contemplates devices capable of operating in any of the described modes. For example, the devices can include a toggle that specifies the mode of operation.

Link Self-Configuration Mode

A brief description of a communication protocol and link configuration are probably helpful prior to a fuller discussion of hot plug management.

Figure 6:
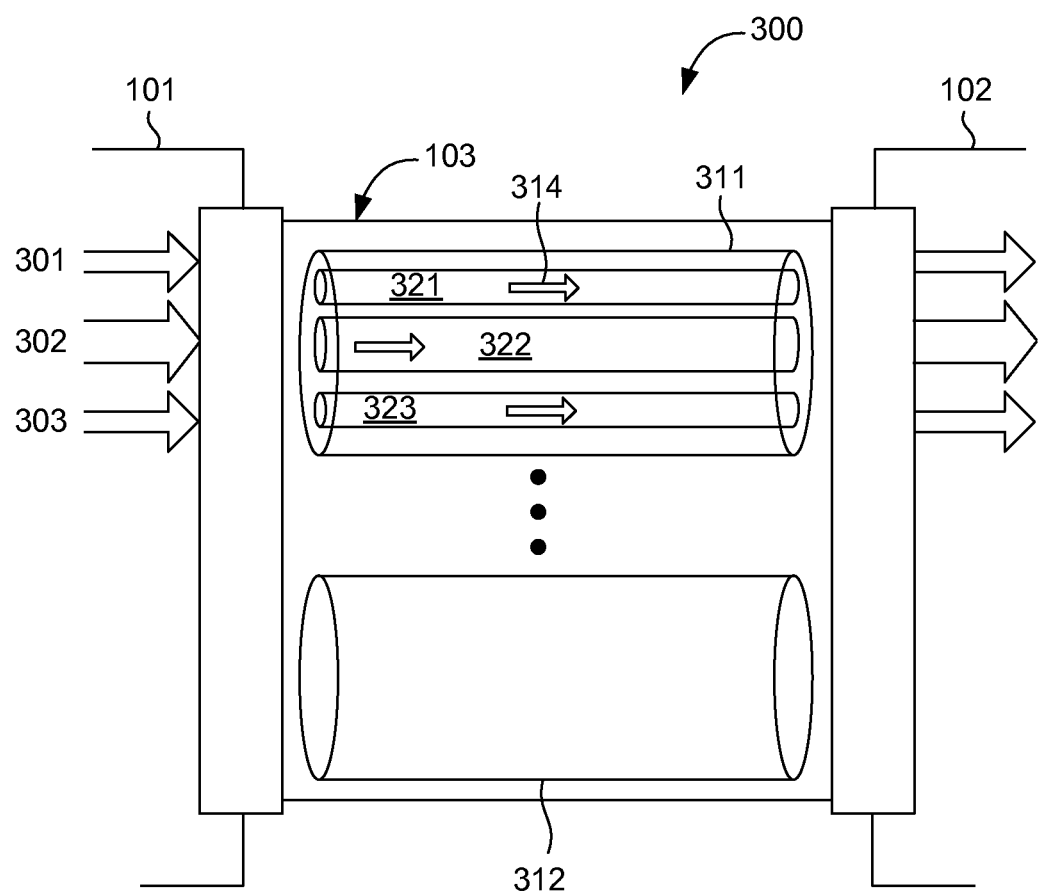
FIG. 6 illustrates an example link embodiment suitable for use in the networks described herein.

A more detailed description of the communication environment will be helpful in illustrating the several modes of operation described in this patent. For example, FIG. 6 shows a generalized representation of a cross platform packet based digital video data transmission system 300 in accordance with an embodiment of the invention. The system uses a data link 103 to connect a transmitter 101 to a receiver 102. The data link 103 can include a plurality of separate uni-directional physical data channels 311, 312. Typically, the number of channels is 1, 2, or 4 but is not limited to such. In the described embodiment, a number of data streams 301-303 are received or generated at the transmitter 101. If needed the transmitter 101 packetizes each the data steams streams into a number of data packets 314. These data packets are then formed into corresponding data streams and each of the data streams are introduced into the data channel 311. In this embodiment, each data stream is passed into the associated data channels by way of an associated virtual pipe 321-323 to the receiver 102. It should be noted that the link rate (i.e., the data packet transfer rate) for each virtual link can be optimized for the particular data stream resulting in data streams each having an associated link rate (each of which could be different from each other depending upon the particular data stream). The data streams can take any number of forms such as video, graphic, audio, etc. The aggregate data rates of the virtual pipes 321-323 can define a link rate for the channel 311.

Typically, when the source is a video source, the data streams 301-303 include various video signals that can have any number and type of well-known formats, such as composite video, serial digital, parallel digital, RGB, or consumer digital video. The video signal can be an analog video signal which is converted to a digital format for transmission.

The digital video signal can be any number and type of well known digital formats such as, SMPTE 274M-1995 (1920× 1080 resolution, progressive or interlaced scan), SMPTE 296M-1997 (1280×720 resolution, progressive scan), as well as standard 480 progressive scan video, and many others such as is suitable for the networked devices.

It should be noted that the link rate is independent of the native stream rates (e.g., the native stream rate of the source device 101). The only requirement is that the link bandwidth of the channel of the data link 311 be higher than the aggregate bandwidth of data stream(s) to be transmitted through that channel. In the described embodiment, the incoming data (such as pixel data in the case of video data) is packed over the respective virtual link based upon a data mapping definition. In this way, the channel 311 (or any of the constituent virtual links) does not, as does conventional interconnects such as DVI, carry one pixel data per link character clock. A further discussion of data rates transmitted through the link is contained in the paragraphs below.

In this way, the system 300 provides a scaleable medium for the transport of not only video and graphics data, but also audio and other application data as may be required. In addition, the invention supports hot-plug event detection and can automatically set each channel (or pipe) to its optimum transmission rate.

Thus, a main link (such as treated in 422 of FIG. 7 below) can include one or a plurality of data channels. Each channel capable of simultaneously transmitting multiple isochronous data streams (such as multiple video/graphics streams and multi-channel audio streams. Accordingly, a main link can include a number of different virtual pipes, each capable of transferring isochronous data streams (such as uncompressed graphics/video and audio data) at multiple gigabits per second (Gbps). From a logical viewpoint, therefore, each channel of the main link appears as a single channel with possibly many virtual pipes established. In this way, each data stream is carried in its own logical pipe.

It should be noted that the main link can comprise a plurality of discreet channels and may have adjustable properties. For example, the speed, or transfer rate, of the main link can be adjusted to compensate for link conditions. In one implementation, the speed of each channel of the main link can be adjusted in approximately 0.4 Gbps increments. At maximum throughput, the link can transmit about 2.7 Gbps per channel. Additionally, in one embodiment, the main link can include 1, 2, or 4 main channels. In one example, by setting the number of channels to four, the main link 422 can support WQSXGA (3200×1028 image resolution) with a color depth of 24-bits per pixel at 60 Hz. or QSXGA (2560× 1028) with a color depth of 18-bits per pixel at 60 Hz, without data compression. Even at the lowest rate of 1.62 Gbps per channel, only two channels are required to support an uncompressed HDTV (i.e., 1080i or 720p) data stream.

In addition to providing video and graphics data, display timing information can be embedded in the digital stream providing essentially perfect and instant display alignment. The packet based nature of the inventive interface provides scalability to support multiple, digital data streams such as multiple video/graphics streams and audio streams for multimedia applications. In addition, a universal serial bus (USB) transport for peripheral attachment and display control can be provided without the need for additional cabling.

Figure 7:
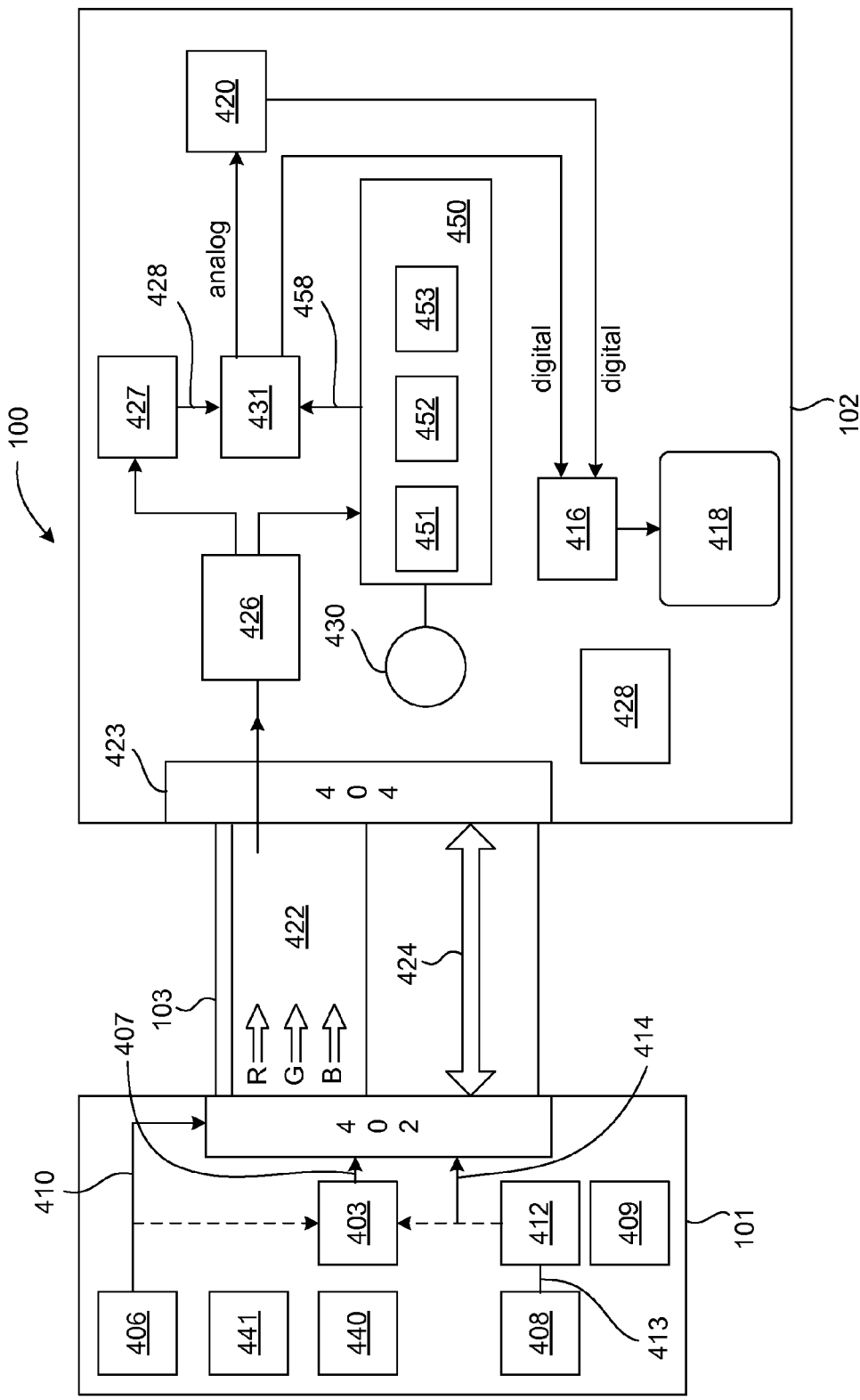
FIG. 7 is a generalized network diagram showing a sink device in communication with a source device via a data link in accordance with the principles of the invention.

The context of embodiments of the invention is further explained with reference to FIG. 7. FIG. 7 is another simplified view of the system 100 shown in FIG. 1 that is used to connect an audio-video source 101 and an audio-video display unit 102. The network source 101 is in communication with network sink 102 via a data link 103 of a type described in FIG. 3 about and explained in greater detail in, for example, in U.S. patent application Ser. No. 10/726,794 entitled "PACKET BASED VIDEO DISPLAY INTERFACE AND METHODS OF USE THEREOF" filed Dec. 2, 2003 and hereby incorporated by reference herein for all purposes.

Referring again to FIG. 7, the source 101 can, for example, include either or both a digital multimedia source 406 and an analog multimedia source 408. In the case of the digital source 406, the content (a digital data stream) 410 is provided to the transmitter 402 which is interfaced with the data link 103. Typically, the transmitter comprises a data interface enabling communication with another network device through the data link 103. In the case of the analog video source 408, an A/D converter unit 412 converts an analog data stream 413 to a corresponding digital data stream 414. Alternatively or additionally, the source 101 can include an encoder 403 arranged to encode the data 410, 414 received from the source 406 or 408. For example, the encoder 403 can convert an eight bit digital data stream 410 (or 414) into a 10 bit data stream 407 in accordance with an ANSI standard 8B/10B encoding scheme. This 8B/10B encoded data is communicated to the sink 102 through the data link 103. As is appreciated by those of ordinary skill said data can be encoding in accord with a number of different schemes. It is also pointed out that the function of encoder 403 can be integrated into convertor 412 which can also receive and encode digital signal 410 in such embodiments. In such case both the converted digital data stream 414 and the digital data stream 410 can be encoded 403, output as an encoded data stream 407. In any case, streams 407, 410, 414 can all be processed similarly by the transmitter 402 and then transmitted through the data link 103.

The source 101 can further include link training circuitry 440 configured to generate link training information associated with the content (e.g., one of 407, 410, 414) to be transmitted to receiving devices. This information can include, but is not limited to clock information, timing information, test and training data patterns, handshake information, and numerous other pieces of information necessary or helpful in configuring a receiver to properly present the content transmitted. Commonly, such configuration and handshaking information is transmitted to a receiving network device via an auxiliary channel 424 of said data link 103. In most cases the configuration (link training) information enables the receiver to reconstruct the audio-video signal.

Additionally, the source 101 can include hot plug detection circuitry 409 (also 216, 226) configured to receive hot plug detect messages from the receiving network device 102 when it is hot plugged into the network. In one implementation, such hot plug information is transmitted and received via the auxiliary channel 424 of said data link 103. In some embodiments, the hot plug detection circuitry 409 can be equipped with a toggle that can be turned off or on. For example, when the toggle is switched "on", the hot plug detection circuitry detects hot plug events when other devices are connected to the source 101 in hot plug events. In such a situation the source 101 can send link training information along with transmitted data. When the toggle is switched off, the hot plug detection circuitry 409 does not detect hot plug events and therefore sends the audio-video signal without sending associated link training information.

Also, if desired the source 101 can further include a power saving module 441 configured send power control messages to associated network devices connected with the source. For example, after some preset time period the source can send a message to a sink instructing it to power down some or all of its systems and/or sub-systems to save power until such time as the system has need of it. Many different implementations of this embodiment are contemplated by the inventors. Commonly, such power save information is transmitted to a receiving network device via the auxiliary channel 424 of said data link 103.

In some embodiments, the source 101 can be configured to include a default transmission mode (such as discussed above). As a reminder, in one particular embodiment, data can be transmitted through 1, 2, or 4 channels of the main link 422 and generally at a minimum bit rate of about 1.62 Gbps to a maximum of 2.7 Gbps per channel. It should be noted that the source 101 can be configured to transmit network content in a simplified default mode. The default mode involves transmitting data over a single data channel (even when more than one channel is available) and at a lowest available bit rate. For example, the default mode can transmit data through a first data channel ($L_0$) and at a at reduced bit rate (RBR) of 1.62 Gbps. This default mode can be used by a sink device to conduct self-configuration to overcome a lack of link-training information. This will be discussed in greater detail in following portions of the disclosure. In any case, in implementations where the default rate is known by the sink device, the default mode significantly reduces the complexity of the self-configuration process and therefore increases the speed of the process. Alternatively, the default mode can be toggled off and the discussed self-training approach can be employed. Or the toggle can be set to perform the self-training on a default signal.

The content is ten transmitted through the data link 103 to the sink device 102 where it received as a stream of audio-video data (an audio-video signal) 423 that can be decoded, displayed, used, or otherwise consumed. In this further description, the sink will be described as a display device (but is expressly not limited to such). The sink device 102 receives the transmitted network content through the sink interface 404 of the data link 103 as a data stream.

Upon the hot plugging of the sink 102, the sink can send a hot plug detect (HPD) message to the source device such that the source 101 becomes aware that a hot plug event has occurred. For example, the HPD message can be sent by HPD messaging circuitry 428 through said auxiliary channel 424 of the link 103. Accordingly, the auxiliary channel can enable a sink 102 to send the HPD message to the source 101 upon connection and power up of the sink device 102. The source 102 receives 409 the hot detect message and responds to it in one of a number of ways described herein.

When an HPD message is received, recognized, and processed at the source, under the correct conditions, the source can acknowledge receipt of the HPD message. Typically, this comes in the form of data messages containing link training information concerning the transmitted audio-video signal which can be transmitted to the sink using the auxiliary channel 424. As will be described herein, under some conditions the sink will not send a HPD message and also under some conditions the source will not receive, detect, or recognize, an HPD signal sent by the sink (such as events $x_1$ and $x_2$ of FIG. 2). An important aspect of the invention describes how the system deals with these types of events.

To continue, the received audio-video signal 423 can be input into link communication circuitry 426 that determines whether the audio-video signal 423 has associated link training information or is received without the link training information. Where the link training information is provided in association with an audio-video signal, the link training information is processed by circuitry 427 designated for reconstruction of the signal based on source generated link training information. For example, circuitry 427 can include a time base recovery unit that enables the reconstruction of the signal 423 after the circuitry performs a standard link training protocol to configure the sink enable reconstruction of the data stream of the audio-video signal. Such link training protocols are known to persons of ordinary skill in the art.

In the absence of link training information the signal 423 can be reconstructed using characteristics of the received audio-video signal itself and the local clock 430 of device 102. Thus, when audio-video signal 423 is received without associated link training information, the audio-video signal is processed by self-configuration circuitry 450 to reconstruct the data stream of the received audio-video signal.

The self-configuration circuitry 450 works in conjunction with a local clock 430 of the device 102 to enable self-configuration of the device 102 to stabilize and correctly interpret the received data 423. This enables the original signal to be reconstructed from the packetized data stream received from the source 101. This signal 423 is frequency and symbol locked with a local clock 430 (in processes that be explained in detail later) and then decoded for further processing or display. The frequency and symbol locking is the result of processes which, in one embodiment, are each performed separately by modules 451, 452, and 453. Module 451 may be referred to as an active-channel utilization module or circuitry for determining the number of channels or lanes being used to carry signal 423. Module 452 is frequency setting circuitry for local clock 430 used for setting the local clock frequency to a clock rate synchronized to one of the known link rates. Module 453 is the symbol locking circuitry that identifies symbol boundaries and performs the symbol locking or synchronization. These modules, which comprise self-configuration circuitry 450, are shown in greater detail in FIGS. 7 and 9D as well as elsewhere. FIGS. 9A, 9C, and 11 are flow diagrams illustrating processes for enabling receiver (sink) self-configuration and make reference to components and modules shown in FIGS. 7 and 9D.

The self-configuration circuitry 450 works in conjunction with a local clock 430 of the device 102 to enable self-configuration of the device 102 to stabilize and correctly interpret the received data 423. This enables the original signal to be reconstructed from the packetized data stream received from the source 101. This signal 423 is frequency and symbol locked with a local clock 430 (in processes that be explained in detail later) and then decoded for further processing or display.

The reconstructed signals (either 428 or 458) are then processed by a decoder 431 to decode the received signal and convert to any desired format. Typically, said decoding involves a conversion to a format displayable by display 418. In one particular embodiment, the decoder 431 receives network content 423 from the main link 422 encoded on an 8B/10B format. The 10 bit symbols are decoded and converted back to native 8 bit signals and then forwarded for further processing or display 418. In the case of digital content, the decoded data stream is forwarded to display interface 416 where it is configured for display by display media 418. Additionally, where required, the decoded data stream is forwarded to digital to analog convertor 420 where it is reconfigured as an analog signal and then forwarded to display interface 416 where it is configured for display by display media 418. Although not required, in some embodiments, the display media 418 is an integral component of the sink device 102.

As indicated above, an important aspect of the invention is directed to methods and systems enabling the data to be displayed at the sink in the absence of link configuration information. Referring now to the flow diagram of FIG. 8 and system diagram FIG. 7, an embodiment of a method of communicating audio-video data between devices in a multimedia network is disclosed.

Figure 8:
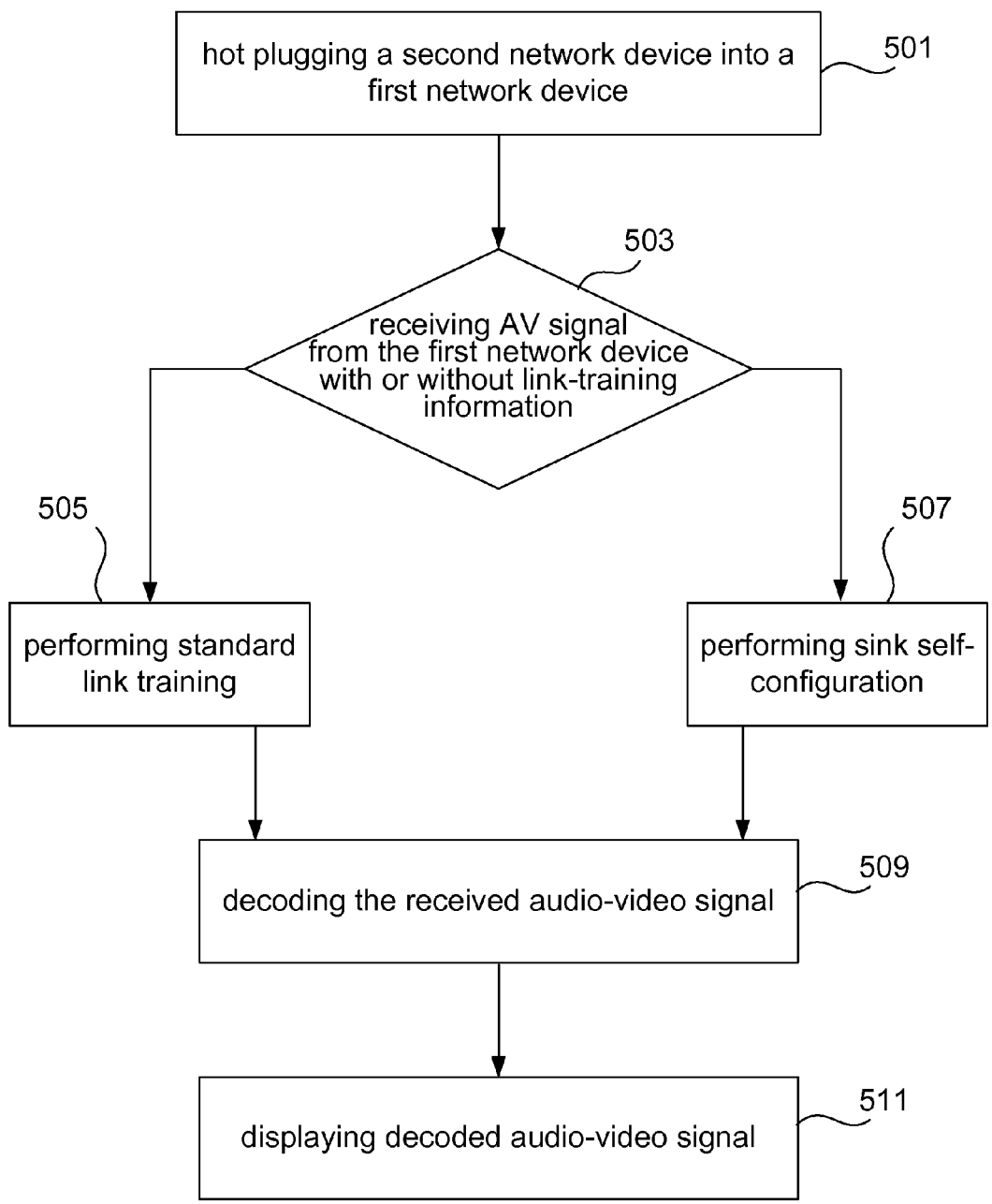
FIG. 8 is a flow diagram illustrating another approach to handling hot plug events in a multi-media network in accordance with the principles of the invention.

The process is briefly described with reference to FIG. 8 as follows. A suitable process begins with an operation of hot plugging a second device into an active first network device via a data link (Step 511). Such a hot plug event is as described previously. For example a powered sink device 102 (e.g., a display device) is plugged into a powered source device 101 (e.g., a computer device). In an alternative example, said devices are already connected and unpowered sink device 102 switched on (e.g., at time $t_1$).

In response to the hot plug event, the second network device 102 (e.g., a sink) provides a hot plug detect message (HPD message) to the first network device (e.g., the source). In the architecture described herein, such an HPD message is sent from sink 102 to source 101 through a bi-directional auxiliary channel 424 of the data link 103. Also, it should be pointed out that some embodiments of the network devices 101, 102 can be configured with a hot plug messaging toggle 428 on the sink/receiver 102 that can be switched to an "on" or "off" position. The off position indicating that no HPD messages are sent by the device until the toggle is switched into the "on" configuration which allows HPD messaging. Also, the inventors contemplate network devices 102 that do not have HPD messaging capability at all. In the absence of such capability or in a toggle "off" configuration the sink device 102 does not send HPD messages. When the sink 102 is configured appropriately, the device will send at least one HPD message (such as an interrupt signal) in response to the hot plug event. As an aside, the inventors point out that the hot plug detection circuitry 409 of the source device 101 can also be toggled to selectively receive HPD messages or not.

The process embodiment disclosed herein can accommodate both devices that do, or do not, send HPD messages. With continued reference to FIG. 8, the next operation is one of receiving network content at said second network device after the hot plug event (Step 513). Thus, the source 101 sends network content whether or not a HPD message is sent by the sink 102 or not. Moreover, the source 101 sends network content whether or not the source 101 receives and recognizes the HPD message.

An important attribute of the invention is that the source sends the data in one of a finite number of configurations. To begin, the embodiment sends data at one or two link rates comprising known bit rates. For example, the data link rates are either a reduced bit rate (RBR) of 1.62 Gbps or at a high bit rate of 2.7 Gbps. Thus, the data is sent at one of a finite number of bit rates. Here, we have two standardized bit rates.

Also, the data is sent over a finite number of channels, 1, 2, or 4 channels. Thus, in the foregoing circumstance, the data is received in one of six possible modes (two different bit rates over three possible channel combinations). Of course the number of bit rates and channel combinations can be adjusted to accommodate different or improved technologies, but the basic idea is that a finite number of channel and bit rate combinations are used to transmit the data stream in one of a finite number of transmission modes.

Additionally, the invention contemplates the "default" data transmission mode for the source described above. In particular, the default mode can be very useful as a mode of operation for networks having more primitive receivers. Thus, when a source device does not receive and recognize HPD messages from a sink device it sends data in a default mode. In one particular default mode, the data is sent a RBR (1.62 Gbps) through a single data channel. Accordingly, the data is received at the sink device 102 in a serial data stream through one channel (for example a default first channel $L_0$) at the lowest available bit rate. Under such conditions, the receiving device will have little difficulty in handling the signal. However, in a more general case, the data is transmitted in one of a small number of finite transmission modes. In this embodiment, at one or two different link rates (1.62 Gbps or 2.7 Gbps) over 1, 2, or 4 channels.

The source device can respond differently to the received data depending on whether associated link training information is also provided. Whether said link training information is provided can depend on a number of factors. For example, when or if the HPD message is received at the source or what toggle configuration is being used. For event $x_0$ the standard VBIOS start up routine can institute a link training that will enable the device 102 to receive and symbol and frequency lock the data with the display local clock, and display the data based on transmitted link training information from the source. For event $x_3$ the operating system in conjunction with the appropriate device drivers can institute a link training that will enable the device 102 to receive, symbol and frequency lock the data with the display local clock, and display the data also based on transmitted link training information from the source. In response to events $x_1$ and $x_2$, a somewhat different approach may be taken.

Referring to the "dark period" condition described in FIG. 2 at event $x_1$ a hot plug event occurs prior to operating system booting begins (prior to $t_2$). Accordingly, the VBIOS operates to deal with link state changes and interrupts. Importantly, during the period 201 the source 101 does recognize HPD messages and so cannot provide link training information as required to conduct standard configuration of the sink 102. Thus, multi-media data sent by source 101 arrives at sink 102 but because the sink has not been properly configured it arrives without being provided the associated link training information. Therefore the sink 102 is not configured to display the content. The same can be said for an event $x_2$ type event.

At this point one of two actions is taken. The sink device 101 has received, depending on the source device 102 response to the hot plug event, either (i) link training information AND network content from the source device 101 or (ii) network content from the source device 101, WITHOUT said link training information. As to instance (i), most typically, such events occur before $t_1$ and after $t_3$ (of FIG. 2). Commonly, in such conditions the source 101 is capable of receiving, recognizing, and responding to HPD messages from the sink 102. In accordance, the source provides link training information to the source that can be used to configure the sink and data link to receive data. This leads to standard link training (Step 515). Alternatively, in instance (ii), the sink device 102 receives the network content without said link training information. This can be due to a variety of different conditions but can occur when the source 101 is unable to receive and recognize HPD messages sent by the sink after a hot plug event. This signals to the sink 101 that local self-training should be performed (Step 517). Type (ii) instances generally occur when hot plug events (in this case events $x_1$, $x_2$ of FIG. 2) occur prior to OS set up (in time periods 201, 202, prior to $t_3$) or when the source fails to send link training information for other reasons. Because during this time period, the source does not handle interrupt events (such as hot plug events) well. The present invention includes methods for getting around the difficulties in the present art.

Again referring to FIG. 8, in Step 515, the sink device selectively performs device configuration based on the information received in the preceding step. In the case (i) where link training information is provided to the sink 102 by the source, the sink uses this information perform link configuration. In ordinary link training, the link training information is transmitted to the sink via the auxiliary line 424. This link training information can include information including, but not limited to, number of channels operational and transmitting data, symbol boundary information, timing information, link rates, test patterns used to stabilize the link as well as other information. Any one of a number of link training processes can be used to operate upon this information to provide a stable and accurate data link. A particular methodology that may be used is that set forth in U.S. patent application Ser. No. 10/726,794 entitled "PACKET BASED VIDEO DISPLAY INTERFACE AND METHODS OF USE THEREOF" filed Dec. 2, 2003.

Example Embodiment of Link Self Configuration

Again referring to FIG. 8, when the sink performs self-configuration (Step 517), for example, in instance of type (ii) where no link configuration data is provided by the source, the sink device 102 will perform "self-training" to configure the system to receive and display data from the source. FIG. 9A is a flow diagram illustrating one process for conducting self-configuration of the sink 102 to receive data from the source 101.

Such a process begins with the sink 102 receiving network content from the source (Step 601). Referring to the highly simplified diagram of FIG. 9B, a system 100 having a sink device 102 in communication with a source device 101 through a data link 103 is depicted. In this depiction, the link 103 is shown with four data channels ($L_0$, $L_1$, $L_2$, $L_3$). The sink 102 is receives data through all available channels (here four). As shown in this example, data ($I_0$, $I_1$) is input into two channels ($L_0$, $L_1$).

The sink will then determine how many channels are sending data (Step 603) using active-channel determination circuitry 451 shown in FIG. 7. This can be accomplished using any of a number of methods. In a preferred embodiment, since each channel typically has its own circuit, all channels can be tested in parallel; each circuit is tested at the same time to see which ones are sending data. In this embodiment, the number of channels being used is determined in one test. FIG. 9D provides a detailed block diagram of one embodiment of self-configuration circuitry 450. Active-channel module 451 is shown as having two modules. The parallel testing of all the channels is performed by parallel testing module or circuitry 1202. In another embodiment, the channels are tested sequentially. This sequential testing mode is a useful alternative to have available to the sink 102 where for whatever reason the channels cannot be tested in parallel. In common usage the channels are filled by the source from lowest to highest. Thus, in one example, the sink 102 will simply test each of the channels in a sequential pattern.

The flow diagram of FIG. 9C describes a process of sequentially or serially testing the channels to determine which are being used in accordance with one embodiment. At Step 902 the sink 102 determines the total number of operational channels in link 103. A counter is set to this number of potentially operative lanes. If there are four channels, according to normal practice, either 1, 2, or 4 channels are used (that is, if L2 is used, the fourth lane, L3 is also used). Use of a counter is optional. It is shown here to describe one possible implementation. In the described embodiment, it is used to determine whether all the lanes have been tested. In other embodiment, module 1204 can simple see if there are more lanes. In the example above, there are four channels or lanes that may be operational. In other embodiments, there may be more or fewer operational lanes. At Step 904 the first channel, $L_0$ is tested to see if data is being sent. If no data is received over this channel, the sink 102 knows that no data is being received from the source at which point, at Step 906, the process is complete.

If there is data on $L_0$, control goes to Step 905 where the counter is decremented by one and then checked to see if it is zero. If it is zero, indicating there are no more lanes, there is no data transmitted and the process is complete at Step 907. In this scenario there was only one operational channel. If the counter is not zero, at Step 908 the sink then determines whether a second channel, $L_1$ is transmitting data. If data is not being received over this channel, control goes to Step 910 where the sink has determined that data is only being received over channel, $L_0$. If data is being received over the second channel, $L_1$ control goes to Step 911 where the counter is decremented by one and is checked to see if it zero. If it is zero (i.e., there were only two operational lanes), the process is complete. If it is not, control goes to step 912 where a third channel, $L_2$, is tested. If data is not being received over $L_2$, the sink 102 has determined that only two channels are sending data at Step 914 and the process is complete.

If the third channel, $L_2$, is sending data, the counter is decremented and tested to see if it is zero. In the example where there are four channels and the counter was set to three because typically either 1, 2 or 4 channels are in use, the counter is now zero. As noted, if the third channel, $L_2$, is being used, then, based on common practice, the fourth channel, $L_3$ is being used. At step 916 the sink has determined that all four channels or lanes are being used to send data. Thus, the sink 102 has determined using an alternative sequential testing method, which lanes are being used for transmitting data. As noted above, this data would normally be transmitted as one of the data components of the link training data. With reference to FIG. 9D, this sequential or serial testing process is performed by serial testing module 1204 within active-channel utilization module 451. In sum, module 1204 in the sink 102 may test $L_0$ first, if no data is received from $L_0$, the sink 102 is aware that no data is being sent. If data is received through $L_0$, the sink 102 is aware that that at least $L_0$ is active and will then test $L_1$, if no data is received from $L_1$, the sink 102 is aware that data is being sent through $L_0$ alone. If data is received through $L_1$, the sink 102 is aware that that at least $L_0$ and $L_1$ are active and will then test $L_2$. If data is received through $L_2$, the sink 102 is aware that that at least at least $L_0$, $L_1$ and $L_2$ (and, in accord with most schemes, $L_3$ as well) are active, and if no data is received from $L_2$, the sink 102 is aware that data is being sent through $L_0$ and $L_1$ alone.

This process is made especially easy when the source is in a default data transmission mode transmitting data through a single channel $L_0$ of the data link 103 at a reduced bit rate (e.g., 1.62 Gbps).

Once it is determined how many active channels there are, the data is then examined to identify the bit rate at which the data is being sent through the link 103 and frequency lock this bit rate with the local clock frequency of the sink. In particular, the data is examined to identify state transitions ("edges") in the received data (Step 605). This process can be illustrated with reference to FIGS. 10B and 10C.

FIG. 10B depicts a data stream state diagram 701 useful in illustrating the identification of transition state edges in a data stream associated with received audio-video signal. Also, an associated time line 702 is shown. The data signal 701 depicted here is an 8B/10B signal. As is known, such 8B/10B signals are encoded in accord with a number of parameters specified by the 8B/10B standard. FIG. 10B shows a timing diagram identifying a sequential stream 702 of bit periods 703 associated with the 8B/10B signal 701. The data signal 701 is encoded as a string of ones and zeroes sent over the data link 103. As depicted here the "0" or "1" values of each data bit in the signal 701 are shown. Whenever the data stream makes a transition from "0" state to a "1" state or vice versa, a transition state "edge" 705 is defined. Due to the nature of 8B/10B encoding such transitions or "edges" occur with relative regularity in 8B/10B encoded streams. Here the "edges" 705 are shown at the indicated (at the bit periods 2, 5, 8, 9, 12, 14, 16 and 20). These edges 705 can be used to identify and lock the signal transmission frequency (or data link rate) with the local clock frequency of the sink device.

Once the sink identifies edges 705 for the signal (at Step 605), the sink determines a signal based clock frequency associated with the received data stream (Step 607). One embodiment for enabling such a process is described as follows.

To begin, a relatively fast clock 430 having a stable frequency is required. Typically, the local clock 430 is chosen such that it has a high degree of stability and accuracy and a clock frequency fast enough to match the bit rate of the data transmitted through the link 103 at the highest possible link rate. Clocks having sufficient stability are clocks having a frequency variance of less than about 3%, with clocks having a frequency variance of 1% or less being more preferred. Generally, crystal oscillators such as quartz oscillators have the required stability properties to enable the invention. Moreover, a clock having a clock frequency of at least 27 MHz is generally preferred as being sufficient to process 2.7 Gbps link rates. The clock 430 is used together with the self-configuration circuitry 450 to generate a signal based clock frequency for the received data and lock that frequency to the local clock frequency.

As explained previously, the data stream is transmitted at one of a finite number of data rates (see "known link" 1206 in FIG. 9D). In one particularly pertinent example, the data stream is transmitted through the link at a link rate of either 1.62 Gbps or 2.7 Gbps. Alternatively, where an unstable clock is used a more involved symbol and frequency locking approach can be used. In order to check the signal frequency and lock the signal frequency with the local clock frequency, a process such as described in FIG. 10A can be used and may be implemented using local clock frequency setting circuitry 452. At Step 1002 of FIG. 10A, the a local clock frequency is set initially to a trial clock rate synchronized to one of the known link rates, such as 1.62 GHz and 2.7 GHz (there may only be one or more than two) These known trial link rates are shown as data component 1206 in FIG. 9D. They are shown as input to a clock frequency setting component 1208 which performs the function of Step 1002. In this case, the local clock is set to a first of the two possible frequencies. In this example, the local clock is set to the lower frequency (i.e., set with a clock period that can resolve a 1.62 Gbps signal). This is advantageous because if the signal is being set at a default rate, this slower clock rate will be set at the default rate. In any case, a first one of the finite clock frequencies is set at the local clock.

At Step 1004 the sink 102 determines whether at least one local clock state transition or "edge" is aligned with an incoming signal edge. This is performed by a comparison module 1210 that is able to compare the local clock frequency with the received signal specifically by examining "edge" alignment. If there happens to be alignment of at least one local clock edge with a received signal edge upon initial frequency setting, control goes to Step 1006 where it is determined whether there is acceptable agreement between a minimum number n of local clock edges and n number of received signal edges (described below). If there is, then the process of setting the local clock frequency to the incoming data signal frequency is complete. However, in most cases it is unlikely that there will be immediate alignment between local clock edges and incoming signal edges by virtue of the first frequency setting. If at Step 1004 there is no alignment between a local clock edge and a received signal edge, control goes to Step 1008 where the local clock frequency is phase shifted. This is performed by a local clock frequency phase shifting module 1212. In one embodiment, components 1206, 1208, 1210, and 1212 are part of local clock frequency setting circuitry 452.

FIG. 10C provides an illustration of this principle. A first clock signal 722 (corresponding to a first frequency) is provided by the local clock 430 and then is phase shifted 725 until a clock edge aligns with a signal edge. In this way a phase shifted clock signal 723 is aligned with the signal 713 so that edge 724 of the clock signal 723 aligns with edge 714 of data stream 713. Additionally, a plurality of other edges (e.g., 715-721) are checked against the phase-shifted clock signal 723. Where there is good agreement with clock edges to signal edges, a frequency match is likely. In this depiction, the only edge match is that of 714 and 724, no other signal "edges" match with the clock frequency. In such a case, the clock frequency (associated with signal 723) does not match the frequency of received signal 713. Thus, the self-configuration process has ruled out the first frequency as a match to the received signal. Again, this process is made especially easy when the source is in a default data transmission mode transmitting data through the single channel $L_0$ at the reduced bit rate (e.g., 1.62 Gbps).

However, with continued reference to FIG. 10C, the process continues by setting the clock to a second one of the finite number of clock frequencies. Similarly, the second clock signal (having the second clock frequency) is phase shifted until a clock period is aligned with an edge of the data stream. Again, as shown in FIG. 10C, the second clock signal 741 (corresponding to a second frequency) is phase-shifted 743 to form phase-shifted clock signal 742. This phase shift aligns clock edge 744 with edge 714 of data stream 713. Additionally, a plurality of other signal edges (e.g., 715-721) are matched against the phase shifted clock signal 742. Here, there is good agreement with clock edges to signal edges. In this case, every signal edge corresponds to a clock edge. Because quite a substantial number of clock edges match with signal edges, the sink determines that the frequency match is correct. Thus, the self-training process has matched the signal frequency of the received data 713 to the second one of the finite number of clock frequencies (e.g., a clock frequency associated with 2.7 Gbps). In this way a reasonably accurate clock signal is achieved. Accordingly, a signal based clock frequency is generated and synchronization between signal and clock are achieved.

In another embodiment, the number of channels being used to send data and the link rate of the data transmission are determined in one process. In this embodiment, instead of testing from the default configuration (e.g., 1 lane, 1.62 Gbps (reduced bit rate)), testing begins at the high end of the potential link configurations.

Sink device 102 begins receiving data using the maximum lane count and bit rate configuration (for example, 4-lanes and 2.7 Gbps HBR). In one embodiment, a timer is started to allow enough time for receiver hardware to conduct auto clock recovery and symbol lock at the maximum configuration. Software checks the internal link status until a timeout occurs. If internal link status shows the link is established and stable, then the sink device 102 will stay in this configuration until AUX Link Configuration Write request IRQ is detected. If the link is not established within a given time frame, the link configuration is changed to the next lower and capable lane count and bit rate (2 lanes, 2.7 Gpbs). The timer is restarted after a new link configuration is applied. This process is repeated until the lowest lane count and bit rate configuration (1-lane RBR) is tried.

Returning to FIG. 9A, once the frequencies of the data is determined and an accurate local clock signal is generated, symbol boundaries must be identified for the received data stream (Step 609). By obtaining the correct frequency the sink can now obtain accurate reads on the data bits as they are received. But must now determine the symbol boundaries. In 8B/10B encoding, each symbol comprises a 10 bit "word". Certain words can be used to discern symbol boundaries. Examples include the K28.1 and K28.5 symbols of the 8B/10B standard. In one example control symbol K28.5 of the 8B/10B standard can be used to identify boundaries for symbols in a data stream. The K28.5 symbol can be for example, 001111 1010 or 110000 0101 symbols. Using the 001111 1010 symbol as an example and with reference to FIG. 12, the inventors briefly illustrate one approach for identifying symbol boundaries.

FIGS. 11A & 11B depict a flow diagram of one example of a process of symbol boundary identification and symbol synchronization in accordance with one embodiment. In 8B/10B encoding, each symbol comprises a 10 bit "word". Certain words can be used to discern symbol boundaries. Examples include the K28.1 and K28.5 symbols of the 8B/10B standard. In one example control symbol K28.5 of the 8B/10B standard can be used to identify boundaries for symbols in a data stream. The K28.5 symbol can be for example, 001111 1010 or 110000 0101 symbols. Using the 001111 1010 symbol as an example and with reference to FIG. 12, the inventors briefly illustrate one approach for identifying symbol boundaries in an 8B/10B encoded data stream.

Once the frequency has been determined for the data being read by the sink, a data stream can now be interrogated to identify symbol boundaries. Once a symbol boundary is identified, a start point for reading the encoded data is also identified. Thus, symbol locking can be used to decode a data stream. Here, the time synchronized data stream 801 is input into the sink which begins reading the data stream 801 at step 1102. In this example, the data begins at the left and is read left to right. In the stream is a K28.5 symbol 802. Since the sink is not aware of where symbol boundaries are, but does know what one type of symbol looks like (the K28.5 symbol) it can use that symbol to define symbol boundaries for the entire data stream The process continues by screening the stream 10 bits at a time looking for the symbol. For example, beginning at first 10 bit string 811 and checking to see if it a K28.5 symbol. This is shown at step 1104 where the sink screens a 10-bit stream in the data stream. This is performed by bit stream screening component 1214. This first 10 bit string 811 is disregarded as a symbol boundary as it does not match the bit string required for a K28.5.

At step 1106 it is determined whether the symbol read at step 1104 is a K28.5 character or another suitable marker that can be used to define a symbol boundary (for example a K28.1 symbol). Such process being performed by a symbol comparison module 1216, in this case a K28.5 comparison module. In other embodiments, module 1216 may be a K28.1 character comparator or other suitable character comparator. The data stream is interrogated until a suitable symbol (e.g., K28.5) is identified. The process of identifying the symbol boundary continues, for example, by shifting one bit to the right and then screening the next 10-bit sequence of bits to determine if it is representative of the desired symbol (e.g., a K28.5 or other suitable symbol) until a desired symbol is identified. Thus, the string is screened to identify symbols. If the desired symbol (e.g., K28.5) is not identified (at 1106) the screening process continues (see, 1108). In one example, this means the data string is reexamined by shifting one data bit and reevaluated (step 1108) to determine if the next 10-bit sequence defines the desired symbol. Steps 1106, 1108 are repeated until a K28.5 symbol is identified. This is schematically depicted in FIG. 12 where the same screening is performed for each of 812, 813, 814, 815, and 816 as each possible 10 bit string is sequentially read one after another. This is repeated until string 817 (also 802) is read as a K28.5 symbol. Once this known symbol is identified at step 1106, the process confirms that a correct symbol lock is achieved.

Accordingly, in one approach, control goes to step 1109 where a checking process confirms that the identified 10-bit string is in fact an authentic K28.5 symbol. A single K28.5 symbol can possibly be a mistake or a coincidental bit string so a confirmation of correct alignment can be performed. So until the tentatively identified symbol (e.g., the K28.5 symbol) is determined to be correct, such symbols are "proposed" symbols. Accordingly, the data stream is aligned in as a string of 10 bit words using the proposed K28.5 symbol to define a symbol boundary (Step 1109).

Further, using the proposed K28.5 symbol to define a symbol boundary, a series of 10-bit symbols of the data stream are screened (using the proposed K28.5 as a reference) (Step 1110). If the screening process reveals a number of other K28.5 symbols in the string, it is clear that the symbol lock is likely correct. If no other K28.5 symbols are located, it is likely that the identified symbol was an incorrect identification and does not define a symbol boundary.

Accordingly, the process will continue to screen the string, one symbol at a time, looking for more symbol boundaries (e.g., K28.5 symbols) (Step 1112). Typically, this procedure is set to last until a specified number of further symbol boundaries are found (further K28.5 symbols) or until a specified period of time elapses, which ever occurs first. If none are found over a pre-set time interval, it is a good indication that the symbol alignment of the data stream is incorrect and symbol lock has not been achieved. This search may last perhaps about 1 millisecond. The idea being that enough further K28.5 symbols are identified to define a regular and repeatable pattern consistent with a symbol locked 8B/10B encoding pattern. For example, if the symbols are correctly aligned, further K28.5 symbols will be detected elsewhere in the data stream. Commonly, three or four further K28.5 symbols in the aligned stream may serve as an effective validation threshold. Ten or so K28.5 symbols being more than sufficient to validate correct symbol alignment for the data stream (step 1114).

Once correct alignment is achieved control goes to step 1118 where the symbol pattern is identified by symbol pattern identifier component 1218. At this stage, the symbol boundaries have been identified and the symbol pattern and rate is now recognizable. At step 1120 the symbol rate is locked with the local clock by symbol synchronizing component 1220. After this symbol synchronization, performed at step 1120, the sink can decode the data stream at step 1122. Thus, such screening can rapidly identify symbol boundaries without link training information (or any other information) from the source device.

Thus, referring again to FIG. 9A, the data stream bit frequency has been determined and the local clock frequency has matched and phase shifted to the data link rate to lock the local clock frequency with the link rate (Step 611). The symbol boundaries have been screen for and identified. Accordingly a symbol rate is identified and locked to the clock rate. Thus, a decodable data stream has been obtained by the self-configuration process. Advantageously, the process of frequency determination, frequency synchronization (frequency locking) with the local clock, symbol boundary identification, and symbol synchronization (symbol locking) with the local clock are all accomplished without link training information using only the audio-video signal.

Returning to FIG. 8, the data stream is now decoded by the sink device 102 (Step 519). This can be decoded in accordance with a number of schemes. The 8B/10B signal can be converted back to 8-bit signal, the data stream can be converted to an analog signal, and many other decoding processes. For example the modules 431, 420, and/416 of the receiver 102 can be used to decode the signal for input into a display 418. Once decoded the signal can then be forwarded for further processing or displayed using a display media (CRT, LED monitor, LCD monitor, etc.) (Step 521).

In addition, embodiments of the present invention further relate to integrated circuits and chips (including system on a chip (SOC)) and/or chip sets. By way of example, each of the devices described herein may include an integrated circuit chip or SOC for use in implementing the described embodiments and similar embodiments. Embodiments may also relate to computer storage products with a computer-readable medium that has computer code thereon for performing various computer-implemented operations. The media and computer code may be those specially designed and constructed for the purposes of the present invention, or they may be of the kind well known and available to those having skill in the computer software arts. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor. In addition to chips, chip systems, and chip sets, the invention can be embodied as firmware written to said chips and suitable for performing the processes just described.

The inventor points out the following. Under ordinary operation conditions when a sink is hot plugged to a source device, the sink can send an interrupt message using a hot plug message generator. When that message (for example a hot plug interrupt message) is received by hot plug detection circuitry of the source, the source will acknowledge the interrupt message and begin link training to configure the data link between source and sink. Upon completion of link training, data is transmitted from source to sink. A problem with this approach is encountered when hot plug events occur in the dead period described above. In some embodiments, the hot plug detection mechanisms of both source and sink can be toggled to off and on configurations. When the hot plug message generator of the sink is toggled on, the sink is referred to as having a hot plug asserted. In an embodiment of the invention, the various hot plug events are handled in the dark period as follows.

There are four toggled conditions; 1) source toggled on, sink not asserted; 2) source toggled off, sink not asserted; 3) source toggled on, sink asserted; and 4) source toggled off, sink asserted. The sink toggle is useful for indicating a data format that the source can send the data in.

For all conditions, the source cannot initiate link training because it is in the dead period. Thus, the sink must initiate self training. Accordingly, at condition 1) the source will not be aware of the hot plug event and merely continues sending standard data. Responsively, the sink performs self-training. At condition 2) the sink does not send an interrupt message and the source cannot not be aware of the hot plug event. Therefore, it merely continues sending standard data. Responsively, the sink still performs self-training. At condition 3) the sink sends the interrupt message (asserted) and the source is aware of receiving the message. So the source sends data in one of a default (reduced bit rate) format or a last known good format. The sink self trains based on this information. At condition 4) the sink sends the interrupt message (asserted) but the source cannot be aware of the hot plug event. Thus, the source merely continues sending standard data. Responsively, the sink still performs self-training.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A multimedia integrated circuit package configured to operate in a multimedia source device, the package comprising:
    a data interface enabling interconnection with a data link and enabling transmission of a multimedia signal through the data link for receipt by a multimedia sink device connected to the interface through the data link;
    a default transmission module configured to send a transmitted multimedia signal in a selected format;
    a toggleable hot plug message detection circuitry configured to detect when the package is connected with said data link, the hot plug message detection circuitry having an on state and an off state configured such that when the hot plug message detection circuitry is in the off state, it cannot detect hot plug events and when the hot plug message detection circuitry is in the on state, it detects hot plug events occurring when connecting a multimedia sink device with the system; and
    wherein a data transmission response is different for a detected hot plug event than for an undetected hot plug event.

2. The integrated circuit package recited in claim 1 wherein when the hot plug detection circuitry is toggled into an on configuration and a hot plug event is detected, the module transmits the transmitted multimedia signal in accordance with one of a default configuration having a specified set of known characteristics or a prior operational configuration enabling successful multimedia signal transmission to the sink.

3. The integrated circuit package recited in claim 2 wherein said default configuration transmits the video signal through a single channel of the link, at a default bit rate, and at a default video resolution.

4. The integrated circuit package recited in claim 3 wherein the default bit rate is a reduced bit rate of 1.62 Gbps and the default video resolution is 640×480.

5. The integrated circuit package recited in claim 2 wherein the default transmission module is configured to include a memory that stores said prior operational configuration enabling successful multimedia signal transmission to the sink; and
    wherein said prior operational configuration enabling successful multimedia signal transmission comprises a recent configuration status for a prior received multimedia signal.

6. The integrated circuit package recited in claim 5 wherein said recent configuration status includes a set of parameters that was used to process the prior received multimedia signal wherein said parameters include the number of channels used to receive the prior multimedia signal, the bit rate used to process the prior multimedia signal, and the resolution used to decode prior multimedia signal.

7. The integrated circuit package recited in claim 6 wherein said hot plug event comprises a disconnect and reconnect event that disconnects and reconnects the sink from the source and,
    wherein the default module is configured to transmit a signal using a prior operational configuration that comprises the configuration used to transmit signal to the sink prior to the disconnecting and reconnecting of the sink.

8. The integrated circuit package recited in claim 6 wherein said hot plug event comprise a port switching event that disconnects a sink device from one port of the source and reconnects the sink to a second port of the source, and wherein the default module is configured to transmit a signal using a prior operational configuration that comprises the configuration used to transmit signal to the sink prior to the port switching event.

9. The integrated circuit package recited in claim 7 wherein if said reconnect occurs before a specified time out period has elapsed the default module processes the received multimedia signal using parameters of said prior received multimedia signal, and if the reconnect occurs after the specified time out period the multimedia signal is sent configured with said specified default format.

10. The integrated circuit package recited in claim 1 wherein said default transmission module is configured to be operational when a hot plug event occurs during a dark time period after a VBIOS of the multimedia source is activated but before the operating system of the multimedia source is fully operational.

11. The integrated circuit package recited in claim 1 wherein when the hot plug detection circuitry is toggled into an off configuration and a hot plug event occurs but is not detected the package transmits the transmitted multimedia signal in accordance with a the configuration used to transmit data immediately prior to said hot plug event.

12. A method of communicating a multimedia signal between multimedia devices in a multimedia network, the method comprising:
    connecting a multimedia source device with a multimedia sink device;
    determining whether a hot plug event can be detected;
    where a hot plug detect is toggled off and said hot plug event is not detected, said multimedia signal is sent in accord with an immediately preceding format;
    where a hot plug detect is toggled on and said hot plug event is detected, then a determination is made as to whether to transmit a multimedia signal formatted in one of a default configuration having a specified set of known characteristics or a last known operational configuration enabling successful multimedia signal transmission to the sink; and
    transmitting the multimedia signal in a selected format comprising one of the immediately preceding format, the default configuration, or the last known operational configuration.

13. The method recited in claim 12 wherein said determining whether to transmit a multimedia signal formatted in one of the default configuration or the last known operational configuration comprises:
    determining whether last known operational configuration information is available;
    determining whether said last known operational configuration information is sufficiently recent;
    where said last known operational configuration information is available and sufficiently recent, said transmitting of the multimedia signal is done using the last known operational configuration; and
    where said last known operational configuration information is one of unavailable or insufficiently recent, said transmitting of the multimedia signal is done using the default configuration having a specified set of known characteristics.

14. The method recited in claim 12, wherein the method is implemented by an integrated circuit.

15. A computer implementable method, embodied on a tangible computer readable media, for communicating multimedia signals between multimedia devices in a multimedia network, the method comprising computer readable instructions for:
    determining whether a hot plug event can be detected by hot plug detection circuitry when said hot plug event occurs during a dark time period after a VBIOS of the multimedia source is activated but before the operating system of the multimedia source is fully operational;
    one of detecting or not detecting a connection of a multimedia source device with a multimedia sink device in accordance with an off or on state in hot plug detection circuitry;
    where said hot plug event occurs but is not is not detected, said multimedia signal is sent in the immediately preceding format;
    where said hot plug event occurs and is detected, determining whether to transmit a multimedia signal formatted in one of a default configuration having a specified set of known characteristics or a last known operational configuration enabling successful multimedia signal transmission to the sink; and
    transmitting the multimedia signal in a selected format comprising one of the immediately preceding format, the default configuration, or the last known operational configuration.

16. The computer implementable method recited in claim 15, wherein the computer readable instructions for determining whether to transmit a multimedia signal formatted in one of the default configuration or the last known operational configuration comprise:
    determining whether the last known operational configuration information is available;
    determining whether said last known operational configuration information is sufficiently recent;
    where said last known operational configuration information is available and sufficiently recent, said transmitting of the multimedia signal is done using the last known operational configuration; and
    where said last known operational configuration information is one of unavailable or insufficiently recent, said transmitting of the multimedia signal is done using the default configuration having a specified set of known characteristics.

17. The computer implementable method recited in claim 15 wherein the instructions are implemented on a circuitry of a multimedia source device.

18. A computer implementable method as recited in claim 15 wherein the computer readable instructions are implemented as firmware on an integrated circuit.

* * * * *